United States Patent
Chau et al.

(10) Patent No.: US 7,545,833 B2
(45) Date of Patent: Jun. 9, 2009

(54) RF DOOR ACTIVATION SYSTEM

(75) Inventors: Phong B. Chau, Indianapolis, IN (US); Raymond G. Benson, Jr., Plainfield, IN (US)

(73) Assignee: MS Sedco, Indianapolis, IN (US)

( * ) Notice: Subject to any disclaimer, the term of this patent is extended or adjusted under 35 U.S.C. 154(b) by 633 days.

(21) Appl. No.: 11/051,310

(22) Filed: Feb. 4, 2005

(65) Prior Publication Data

US 2005/0190798 A1 Sep. 1, 2005

Related U.S. Application Data

(62) Division of application No. 09/441,983, filed on Nov. 17, 1999, now abandoned.

(51) Int. Cl.
H04J 3/06 (2006.01)
H04L 7/00 (2006.01)
G06F 7/04 (2006.01)

(52) U.S. Cl. ................. 370/516; 340/5.61; 340/825.21; 375/354

(58) Field of Classification Search ................. 370/516; 340/5.61, 825.21; 375/354
See application file for complete search history.

(56) References Cited

U.S. PATENT DOCUMENTS

| | | | | |
|---|---|---|---|---|
| 5,025,459 A | * | 6/1991 | Lill | 375/369 |
| 5,128,925 A | * | 7/1992 | Dornstetter et al. | 370/336 |
| 5,325,405 A | * | 6/1994 | Marko et al. | 375/366 |
| 5,680,134 A | | 10/1997 | Tsui | |
| 5,686,903 A | | 11/1997 | Duckworth et al. | |
| 5,696,513 A | | 12/1997 | Song | |
| 5,699,065 A | | 12/1997 | Murray | |
| 5,751,224 A | | 5/1998 | Fitzgibbon | |
| 5,768,269 A | * | 6/1998 | Rakib et al. | 370/342 |
| 5,793,300 A | | 8/1998 | Suman et al. | |
| 5,798,681 A | | 8/1998 | Chang | |
| 5,831,548 A | | 11/1998 | Fitzgibbon | |
| 5,841,390 A | | 11/1998 | Tsui | |
| 5,854,593 A | | 12/1998 | Dykema et al. | |
| 5,872,513 A | | 2/1999 | Fitzgibbon et al. | |
| 5,923,648 A | * | 7/1999 | Dutta | 370/280 |
| 5,925,106 A | | 7/1999 | Beran | |
| 6,130,887 A | * | 10/2000 | Dutta | 370/347 |
| 6,275,519 B1 | * | 8/2001 | Hendrickson | 375/138 |
| 6,301,232 B1 | * | 10/2001 | Dutta | 370/321 |
| 6,407,986 B1 | * | 6/2002 | Dutta | 370/280 |
| 6,501,810 B1 | * | 12/2002 | Karim et al. | 375/369 |
| 6,522,670 B1 | * | 2/2003 | Jokinen et al. | 370/503 |

\* cited by examiner

*Primary Examiner*—Alpus H Hsu
(74) *Attorney, Agent, or Firm*—Homer W. Faucett, III; Ice Miller LLP

(57) ABSTRACT

The present invention provides a radio frequency ("RF") activation system with improved operating capability and ease of installation. Improved responsiveness is provided by the receiver which determines the frame timing of incoming signals and calculates the estimated time of arrival for ensuing frames thus minimizing loss of frame synchronization problems. In one embodiment, this is accomplished by determining the time span of the frame start sequence and using this to determine the frame timing of an incoming RF signal. The receiver also makes corrections for timing errors between the receiver and transmitter by re-synchronizing the receiver with the incoming RF signal.

5 Claims, 15 Drawing Sheets

RF DOOR ACTIVATION SYSTEM

PRIORITY INFORMATION

This application is a divisional application of application Ser. No. 09/441,983, titled RF Door Activation System, filed Nov. 17, 1999 now abandoned, and assigned to MS Sedco.

FIELD OF THE INVENTION

This invention relates to activators for automatic door operating systems, and more particularly to radio-frequency (RF) controlled activators.

BACKGROUND INFORMATION

Recent laws, codes, ordinances and the like have levied requirements mandating public buildings to be made more accessible to those with disabilities. One such law, the Americans with Disabilities Act, enacted in the United States, has had a profound impact on building codes throughout the United States. As a result, many buildings, in addition to hospitals, now provide an automated means for entry, also known as an automatic opening system, for use by handicapped persons.

A basic automatic opening system generally comprises an activating device and an operating device. A handicap access door with this system typically functions by pressing on a large square activation device which is colored blue. This activation device then communicates with an operating device which causes the door to open. For example, a system can incorporate a shaft connected to a piston within a cylinder. Upon activation, a hydraulic fluid is pumped into the cylinder forcing the piston and shaft to move. Thus the door is moved from an initially closed position to an open position. The door is maintained in an open position for a predetermined period of time after which the door is returned to its normally shut position. In the case of an hydraulic system incorporating a spring, the operating device may de-energize the pump and open a vent in the cylinder. The spring then operates against the piston through the shaft and the door, to push the fluid out of the cylinder while closing the door. Alternatively, a system can be designed to use hydraulics in place of a spring by pumping fluid to the opposite side of the piston, and forcing the door shut.

When constructing buildings, it is possible to hard-wire the activation device to the operating device. However, for buildings which were constructed without a handicap access door, hard-wiring the system is frequently impractical. To overcome this problem, automatic garage door activating systems have been adapted for use in handicap access applications. A basic automatic opening system is installed by placing two transmitters on opposite sides of a door. Since the transmitter is battery operated, there is no need to constrain the location of the transmitters due to power availability. Typically, the transmitter is located behind a blue plate at a point near the door.

The receiver is located near the operating mechanism for the door. In many applications, the power source used to operate the door is not compatible with the power source requirements for the receiver. Consequently, transformers and or rectifiers are used to supply the proper source of power. The receiver is then wired to control the desired door operating mechanism and other accessories such as magnetic locks. However, since the receiver is not protected from inductive surges that result when activating devices such as magnetic locks, a separate source of operating power is needed.

However, garage door activating systems designed for objectives or features result in systems which are at odds with the design objectives or features of many automatic door opening systems used to permit access by disabled persons. For example, at one time, it was not unknown for one garage door activating system transmitter to operate with more than one garage door in a neighborhood. This was a very unsafe condition and new systems were designed with tighter parameters so as to reject all signals other than the signal of a transmitter specifically associated with the garage door activating system.

One design feature to address this issue was to reduce the margin for error in the system and reject "marginal" signals from a transmitter, i.e. signals which are slightly off the frequency a receiver is tuned to, or which have some noise or static in the signal. The signal may also be marginal if the transmitter has a clock running at a speed different than the clock of the garage door activation system receiver. In this situation, the transmitter and receiver can lose synchronization. This results in the receiver misidentifying even a valid incoming code and rejecting the signal as invalid. Thus, the receiver is designed to only accept signals with little or no static and which are within a narrow frequency band. Further, the transmitter must have an internal clock running closely to the speed of the receiver's clock or the transmission will not maintain synchronization, and the signal will be rejected. When applied to automatic door opening systems, this leads to a high and unacceptable failure rate. In other words, the door does not open when a person activates the system, constituting a failure. The problem can be further exacerbated by the use of parts with low quality standards which results in frequency drift and high error rates over the life of the transmitter.

Additional failures result from the use of transmitters with degraded batteries or degraded performance due to temperature variations. Both of these conditions can lower the voltage supplied to the transmitter and can affect both the frequency of transmission and the internal clock of the transmitter. One invention which addresses this performance issue is U.S. Pat. No. 5,831,548, Fitzgibbon. Fitzgibbon discloses the use of an inductor coupled to a storage capacitor which functions to maintain a constant voltage supply to the transmitter's oscillator even when battery voltage is starting to degrade. In essence, the battery charges the capacitor while the transmitter is not in use. Upon activation of the transmitter, the capacitor "boosts" the battery and maintains the proper voltage for a short period of time. However, as the battery continues to degrade or the transmitter gets cold, it will take a longer period of time to recharge the capacitor, and eventually, the voltage will not be maintained at the correct voltage during activation of the transmitter.

In addition to applications for general public use, garage door activating systems are used in automatic door opening systems in compound type settings such as a college campus. In a compound setting, several buildings will have automatic door opening systems. However, rather than allowing the general public access to the buildings, only certain individuals are desired to have access to the buildings through these automatic doors. Thus, authorized users are given individual transmitters to be used with the particular RF door opening systems within the compound.

The compound setting presents certain unique problems. As new entrances are provided, they must be fitted with receivers compatible with the existing transmitters. However, commercial garage door operating systems use different frequencies, requiring specific activating devices which transmit at a frequency unique to the receiver. Consequently, upgrading a system can require wholesale exchange of transmitters. Alternatively, U.S. Pat. No. 5,841,390, Tsui, discloses a receiver which is capable of operating with a plurality of transmitters at different frequencies, each transmitter having its own unique code. However, once the Tsui receiver learns the proper codes and frequencies, the receiver operates similarly to other receivers. Thus, for safety purposes, the receiver will reject marginal signals. Therefore, Tsui does not solve the problem of failures resulting from degraded transmitter performance due to battery degradation or environmental conditions.

U.S. Pat. No. 5,793,300, Suman et al., discloses a system which includes an RF receiver which performs a frequency scan when in training mode in order to identify signals at different frequencies. Thus, Suman et al. is useful when a new transmitter is to be used with a system. However, since the frequency scan occurs only in training mode, it is not useful for adjusting to a signal which is changing due to voltage differences during a given transmission or between uses.

Another limitation for garage door openers in the compound setting is that as transmitters fail or are lost, they must be replaced with transmitters which are compatible with the existing receivers. This becomes increasingly difficult as a system ages and replacements are harder to find. Further, incremental improvement of the system, so as to spread improvement costs over a number of years, is impacted. U.S. Pat. No. 5,854,593, Dykema, addresses this problem. Dykema discloses a transmitter/receiver which learns the characteristics of received RF signals and can store and transmit the learned signals. The Dykema transmitter learns the particular signal characteristics when placed into training mode. The learned signal is then stored for use when a particular button on the transmitter is pushed. While this approach is very useful in many scenarios, it has certain intrinsic limitations. Included among these is the fact that the transmitter must be trained for each new receiver. Additionally, the problem of deteriorating transmitter performance is not addressed. Another limitation is that the number of receivers a particular transmitter can be used with is limited to the number of transmit buttons built into the transmitter, unless one "trains" the transmitter each time a new receiver is encountered.

A limitation of garage door openers in many settings is that the receiver for garage door openers are not designed to provide operating power to inductive loads, i.e. devices incorporating coils. However, it is common practice in automatic doors to incorporate inductive load accessories such as magnetic locks, locks and electric strikes into the door operating system. The problem is that when current to a device having a coil is changed, the coil causes a voltage spike or surge. Therefore, if a system without surge protection is used to drive an inductive load, the voltage spike will burn out the system. However, it is preferable to provide operating current to the inductive loads through the activating system receiver to avoid the need for an additional power source and wiring. Consequently, systems relying on commercial garage door openers to drive inductive loads require the addition of surge protectors external the receiver. This results in extra space requirements as well as increased installation planning, equipment, and time.

A related limitation of retrofitting a building with garage door openers concerns the provision of an appropriate power source. The nearest available power source for a given installation location may vary between 12 and 40 volts. However, garage door opener receivers typically operate on 24 VAC power. Thus, if the proper power supply is not available, the installer of the door opening system must either accept the difficulties associated with providing a new power source, carry a variety of receivers for use with different voltage sources, or provide an appropriate assortment of voltage transformers. All of these options significantly increase the complexity of an installation, resulting in excessive planning, material, and labor costs.

The difficulties described above are further exacerbated when it is desired to automate doors in a timed sequence. This application is encountered with buildings having two sets of doors in sequence as is common in entry vestibules. One approach to automating such a building is to use a receiver capable of issuing two timed signals. U.S. Pat. No. 5,793,300, Suman et al., discloses a receiver with this capability. In Suman et al., a first signal is generated which can, for example, turn on a light. At a predetermined interval, a second signal is generated by the receiver to turn the light off. Since two signals are generated, it is conceivable that the first signal could be modified such that a first door is opened, and the second signal could be modified such that a second door is opened. Alternatively, U.S. Pat. No. 5,095,654, Eccleston discloses a receiver which can be used to instigate sequential operations such as manipulating a deadbolt mechanism and then opening a door, although the Eccleston, receiver generates only one signal. Eccleston uses the signal to initiate a sequence of events. However, the receivers of both Suman et al. and Eccleston suffer from the same defects. Namely, they require physical connections between the two doors to be operated, either electrical connections as in Suman, or operating system connections as in Eccleston. Consequently, the benefits of using an RF system are lost.

A particularly irritating shortcoming encountered when using garage door openers in a door activation system is that the transmitter only has operating power applied when its activation switch is depressed. Consequently, it is a common occurrence to depress the switch and let the switch return to its normal condition, only to discover that the door has not been operated. The failure of the system frequently traces to the fact that the switch was not depressed for a sufficiently long period of time. Consequently, an individual is forced to repeat activation of the transmitter. This is frequently accomplished by depressing the switch for an excessive period of time. This operating characteristic, common in garage door openers, is very undesirable in a door activation system.

What is therefore desired is an RF door activation system which is easy to retrofit into existing buildings. The system should not require the use of complicated or expensive transmitters. The system should be useful with a variety of transmitters having differing frequency and frequency drift characteristics without the need to initiate a training mode. It is desired that the system minimize the effect of timing errors. Further, the system should be capable of driving inductive loads without the need for bulky or expensive add-ons. It is further desired that the system be compatible with a variety of power sources without the need for external adapters. It is also desired to realize an inexpensive and dependable transmitter capable of signaling a plurality of receivers upon a single activation of the transmitter. The system should also be capable of transmitting for a preprogrammed period of time even if the activating switch is only activated momentarily.

SUMMARY OF THE INVENTION

The present invention provides an RF activation system for use with automatic door operators with improved operating capability and ease of installation. Improved responsiveness is provided by the receiver and method of operation which determines the frame timing of incoming RF signals and adjusts the receiver frame timing to better match that of the incoming RF signal. Thus minimizing loss of frame synchronization problems. In one embodiment, this is accomplished by determining the time span of the frame start sequence and using this to determine the frame timing of the incoming RF signal. Alternatively, characteristics from different frames may be used to ascertain the frame timing of the incoming RF signal. In one embodiment, this includes verification that the determined frame timing is a valid frame timing. The receiver also makes corrections for timing errors between the receiver and transmitter by re-synchronizing the receiver with the incoming RF signal as a frame of data is being detected. The invention also eases installation concerns as it is capable of being powered by a variety of power sources due to the incorporation of a switching power supply into the receiver. Further, the receiver incorporates surge protectors such that inductive loads can be driven without additional devices being co-located with the receiver. Additionally, the transmitter of the system, in one embodiment, is capable of sending multiple signals separated by predetermined time delays thereby eliminating the need for additional activators when multiple operations are to be performed by the system.

DETAILED DESCRIPTION

Figure 1:
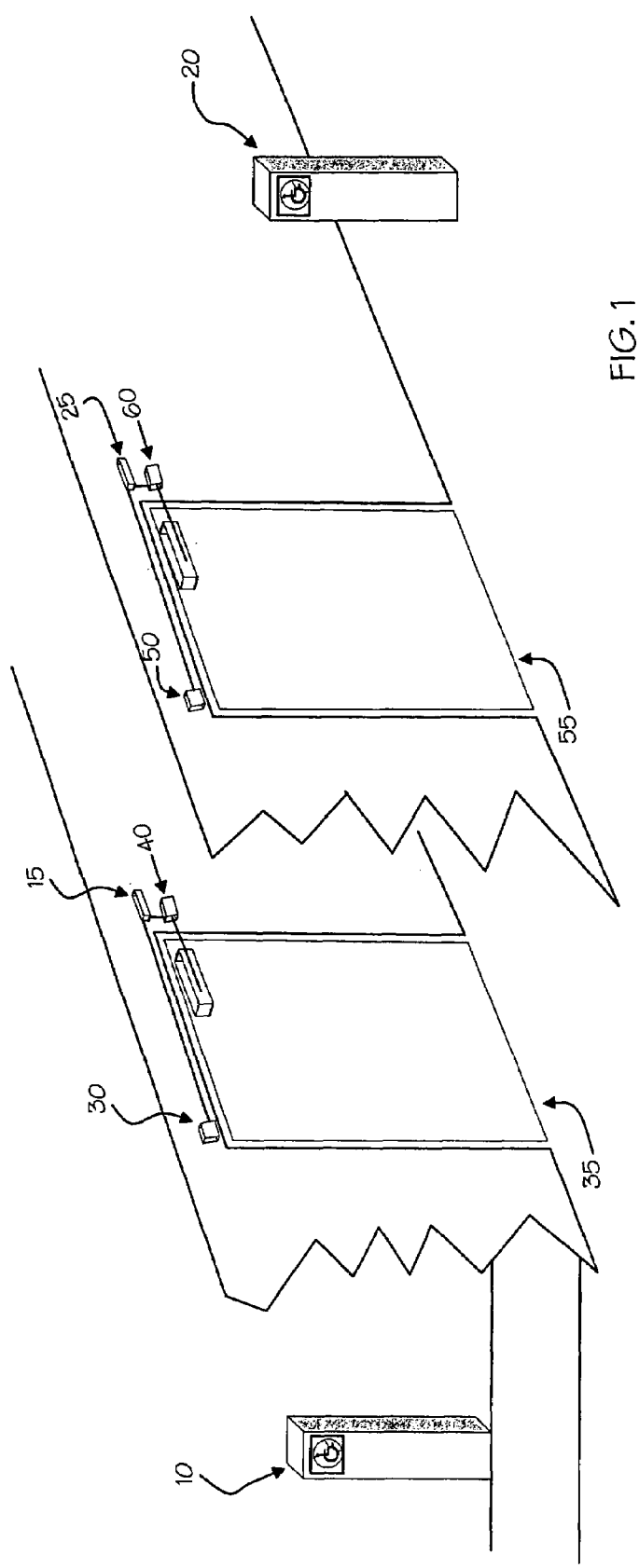
FIG. 1 shows a perspective of a vestibule having two doors with an RF door activation system.

Referring now to FIG. 1, a perspective view of one embodiment of an RF door activation system according to the present invention is presented. FIG. 1 shows a typical vestibule application of a door activation system. The RF door activation system in this embodiment includes outer activator 10, inner activator 20, outer door RF receiver 15, and inner door RF receiver 25. Outer activator 10 and inner activator 20 each comprise an RF transmitter. Outer door RF receiver 15 controls magnetic lock 30 and door operator 40 of outer door 35. Inner door RF receiver 25 controls magnetic lock 50 and door operator 60 of inner door 55.

To enter a building through the vestibule, an individual activates outer activator 10. Outer activator 10 transmits an RF signal comprising a first code which is received by outer door RF receiver 15. Upon verifying the first code as a valid door open command for outer door 35, outer door RF receiver 15 causes magnetic lock 30 of outer door 35 to unlock. After a delay, outer door RF receiver 15 causes outer door 35 to be opened by activating door operator 40 of outer door 35. Outer activator 10 next sends an RF signal comprising a second code which is received by inner door RF receiver 25. Upon verifying the second code as a valid door open command for inner door 55, inner door RF receiver 25 causes magnetic lock 50 of inner door 55 to unlock. After a delay, inner door RF receiver 25 causes inner door 55 to be opened by activating door operator 60 of inner door 55. The doors are maintained open for a preset time, such that an individual entering the building will be able to pass through door. The next event is that outer door RF receiver 15 reverses the signals to magnetic lock 30 and door operator 40 of outer door 35, allowing outer door 35 to shut, and magnetic lock 30 to lock outer door 35 shut. Following this, inner door RF receiver 25 reverses the signals to magnetic lock 50 and door operator 60 of inner door 55, allowing inner door 55 to shut, and magnetic lock 50 to lock inner door 55 shut.

To exit the building, inner activator 20 is activated. Inner activator 20 is programmed to send an RF signal comprising the second code first, thus opening inner door 55 in the manner described above. After a delay, inner activator 20 transmits an RF signal comprising the first code, thus opening outer door 35 in the manner described above.

Figure 2:
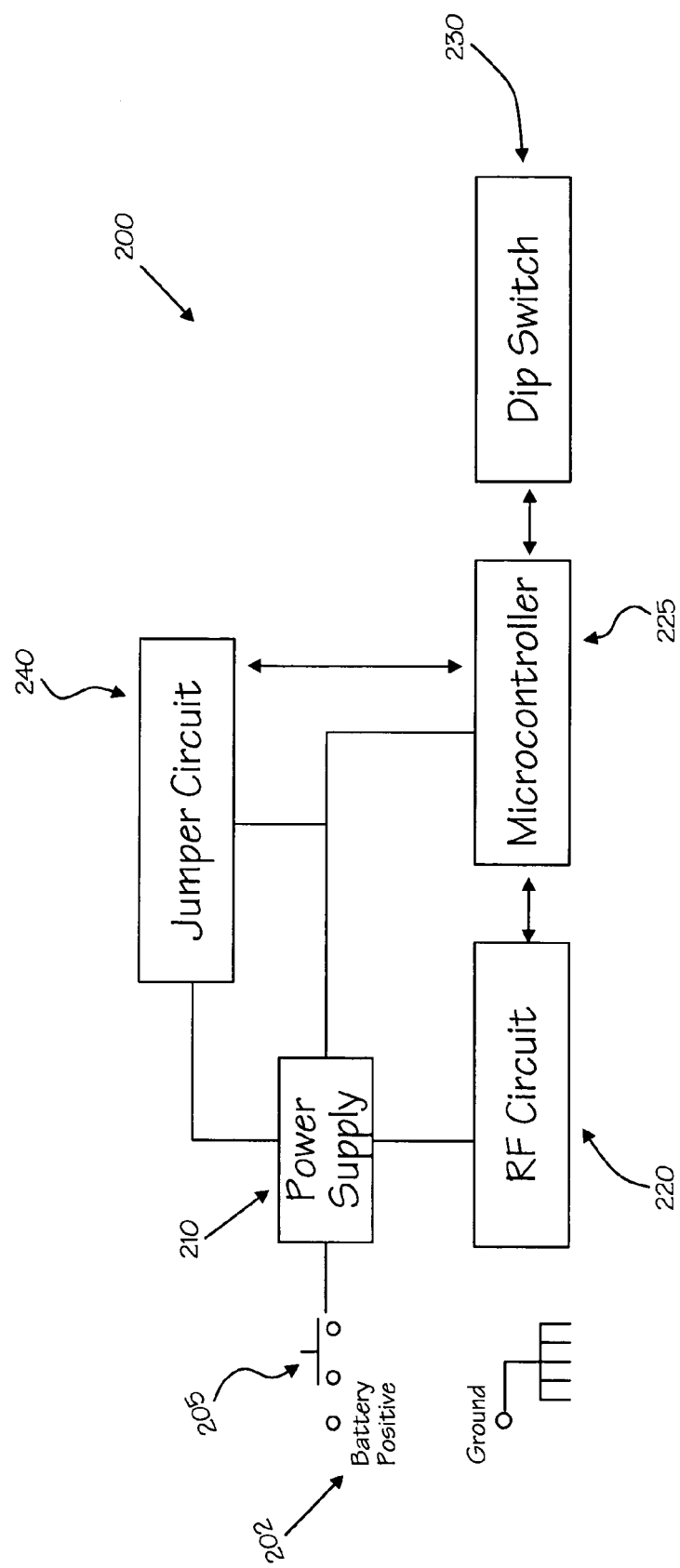
FIG. 2 shows an electrical circuit diagram partly in block and schematic form of one embodiment of a transmitter according to the present invention.

Referring now to FIG. 2, a high level block diagram of one embodiment of a transmitter according to the present invention is shown. RF transmitter 200 is mounted within outer activator 10 shown in FIG. 1. Switch 205, which is closed by activating outer activator 10 of FIG. 1, applies power from battery 202 to power supply 210. Power supply 210 converts the battery power to the necessary voltage for operation of the circuits to which power supply 210 is connected in a conventional manner. Power supply 210 powers RF circuit 220 and microprocessor 225. Microprocessor 225 is a programmable unit such as is available from Microchip, Motorola, or Texas Instruments, Inc. as is well known by persons in the art.

Microprocessor 225 is operably connected to DIP switch 230, jumper circuit 240 and RF circuit 220. As will be discussed in more detail below, the mode of operation of microprocessor 225 is determined by jumpers positioned within jumper circuit 240. The code or codes transmitted by RF transmitter 200 is (are) based upon the set position of DIP switches within DIP switch 230. RF circuit 220 provides the carrier frequency which is used to "carry" a coded signal to the receiver in a system, where the carrier is stripped out and the code signal recovered as will be discussed below.

Figure 3:
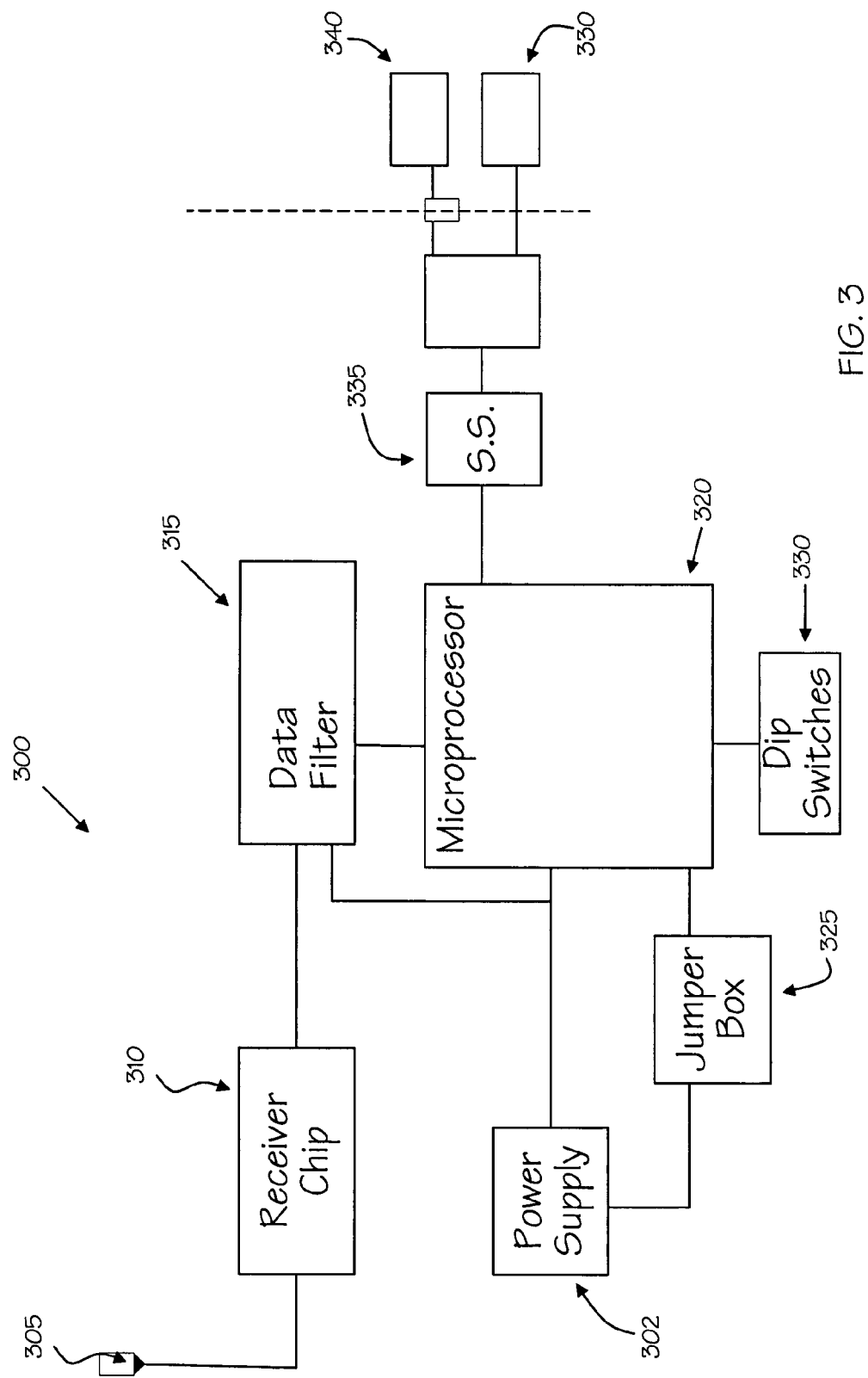
FIG. 3 shows an electrical circuit diagram partly in block and schematic form of one embodiment of a receiver according to the present invention.

Referring now to FIG. 3, a simplified block diagram of a receiver according to the present invention is shown. Unlike RF transmitter 200, RF receiver 300 is normally kept in a powered state. Thus, power supply 302 of RF receiver 300 is hardwired to the other components of RF receiver 300 which use the power supplied by power supply 302. The other components include receiver chip 310, data filter 315 and microprocessor 320. Power supply 302 is also connected to jumper circuit 325, however, in this embodiment, jumper circuit 325 does not consume power from power supply 302. Rather, microprocessor 320 determines the jumper conditions within jumper circuit 325 by the absence or presence of voltage passed to microprocessor through jumper circuit 325. In this manner, functions such as operating mode and time delays for RF receiver 300 are read by microprocessor 320.

Microprocessor 320 is also connected to DIP switch 330 which is used to establish the code or codes which will be acted upon by RF receiver 300. Microprocessor 320 receives code signals which have been detected by antenna 305 and passed through receiver chip 310 and data filter 315. Power to operate utility devices external RF receiver 300 including, but not limited to, door operator 340 and magnetic lock 330 is directed by microprocessor 320 through surge suppressor 335 of receiver 300.

Referring now to FIGS. 1-3, operation of an embodiment of the present invention is described. Before the system can be used, power must be supplied to RF receiver 300. In this embodiment, power is supplied by power supply 302. Upon initialization of RF receiver 300, microprocessor 320 determines the time delays and mode of operation of RF receiver 300 by determining the condition of jumpers within jumper circuit 325. RF receiver 300 then awaits an incoming RF signal. Thus, an individual (not shown) wishing to first pass through outer door 35 and then inner door 55 can now press outer activator 10. This causes switch 205 to be closed allowing power from battery 202 to be applied to jumper circuit 240, microprocessor 225 and RF circuit 220. When energized, microprocessor 225 first determines its mode of operation and time delay by reading the condition of jumpers within jumper circuit 240. Next, microprocessor 225 uses the set switch positions of DIP switch 230 to determine the code or codes to be transmitted. Microprocessor 225 passes a first coded signal to RF circuit 220 where the coded signal is superimposed on a carrier signal generated by RF circuit 220. The combined signal is then transmitted as a combined RF signal.

Outer door RF receiver 15, which is maintained in an energized condition by power supply 302 detects the combined RF signal with antenna 305. The combined RF signal is passed to receiver chip 310. At this point, the combined RF signal is broken into its component parts, namely, the carrier signal and the code signal. The code signal is then passed to data filter 315 where the code signal is further amplified and processed such that an enhanced coded signal is passed to microprocessor 320.

Microprocessor 320 next reads the setting of switches within DIP switch 330 and determines if the received code matches the code set by DIP switch 330. For a valid code, outer RF receiver 15 first de-energizes magnetic lock 30. This allows outer door 35 to be opened. Next, outer door RF receiver pauses for a time pre-programmed within microprocessor 320. This allows magnetic lock 30 of outer door 35 to disengage so that the mechanism does not become jammed when an attempt to open the door is made. After the predetermined pause, outer door RF receiver 15 sends power to door operator 40 of outer door 35 which causes door operator 40 to open outer door 35. The utility devices, magnetic lock 30 and door operator 40 of outer door 35 are then maintained in this configuration for a period of time determined by the time extension set with jumper circuit 325. This receiver time extension allows the individual to pass through outer door 35.

The transmitted combined RF signal was also detected by inner door RF receiver 25, and a similar process performed within inner door RF receiver 25. However, when the received coded signal was compared with the code indicated by the DIP switch settings of inner door RF receiver 25, the codes did not match. Thus, no action was initiated with respect to magnetic lock 50 and door operator 60 of inner door 55.

Meantime, in the present embodiment, RF transmitter 200 has delayed further activity for a period of time determined by the condition of jumper circuit 240. At the completion of the transmitter delay, microprocessor 225 sends a second coded signal to RF circuit 220 where the second coded signal is superimposed on a carrier RF signal generated by RF circuit 220.

The combined signal is then transmitted as a second combined RF signal. The second transmitted combined RF signal is detected by outer door RF receiver 15, and a similar process performed as described above. However, when the second received coded signal is compared with the code indicated by the setting of DIP switch 230 of outer door RF receiver 25, the codes do not match. Thus, no further action is initiated with respect to magnetic lock 30 and door operator 40 of outer door 35.

The second transmitted combined RF signal is also detected by inner door RF receiver 25, and a similar process performed within inner door RF receiver 25 as was described above. In this case, when the received coded signal is compared with the code indicated by the DIP switch settings of inner door RF receiver 25, the codes match. Thus, magnetic lock 50 and door operator 60 of inner door 55 are operated in a similar manner as described with respect to magnetic lock 30 and door operator 40 of outer door 35 above.

Those of skill in the art will recognize that in the above scenario inner door 55 can remain closed for a period of time after outer door activator 10 was pressed without hindering the passage of the individual through the double door entry. However, the time that both inner door 55 and outer door 35 have been open simultaneously has been shortened by means of the time delay of RF transmitter 300. This presents significant savings in energy costs for heated or air conditioned buildings as the energy loss through the double entry doors is significantly reduced. This presents a significant benefit over prior art systems which transmit only one coded signal, thus operating both sets of doors in tandem. Additionally, it will be recognized by those skilled in the art that this has been accomplished by a single activation of outer activator 10, minimizing the disruption to the passage of individuals who are pushing a wheelchair or using crutches who would otherwise have to pause and activate a second activator.

Returning to the operation of one embodiment of the present invention, once RF receiver 300 time delay has lapsed, microprocessor 320 de-energizes door operator 40 of outer door 35 thereby allowing outer door 35 to shut by means such as springs or hydraulics or the like as is well known in the art. Further, power is reapplied to magnetic lock 30 of outer door 35 such that when outer door 35 shuts, it will be locked shut. In like manner, inner door 35 is shut and locked. As will be recognized by those of skill in the art, applying power to magnetic lock 30 will cause an inductive surge which would cause severe damage to RF receivers according to the prior art which are not provided with surge suppressors unless external surge suppressors were added. However, the present invention incorporates surge suppressor 335, thus eliminating the need for additional external surge suppressors.

While one series of events has been described above, those of skill in the art will recognize that the present invention allows for numerous variations. The timing of the opening and closing of the doors can be adapted to the specific application. Thus, where there is a long distance between the doors, the first door may close before the second door opens. Alternatively, there may be only a slight difference in the open and shut times for doors set close together. Other variations allow for the expected speed of those passing through the doors. All of these variations are within the scope of the present invention which allows for customization of timing to optimize efficiency of passage while minimizing energy losses.

Detailed operation of an RF transmitter according to the present invention which allows for the above customization is described by reference to FIG. 4, which shows a schematic diagram of an embodiment of RF transmitter 200 and FIG. 5 which shows a flow diagram of processes carried out in the transmitter microprocessor. By depressing switch 405, which in this embodiment is the activation switch, power is supplied to RF transmitter 400 by battery 402 which corresponds to step 505 of FIG. 5. Those of skill in the art will recognize that in certain applications, alternative power sources will be available for RF transmitter 400 including, but not limited to, power from the building being serviced and solar power, these variations being within the scope of the present invention.

At step 510, microprocessor 425 determines the mode of operation which has been set for RF transmitter 400 according to the following procedure:

1) Ports B5 and B4 of microprocessor 425 are set as outputs and set low;
2) Clear RTCC;
3) Output eight "1" pulses on port A1, then set port low; and
4) Read RTCC.

If jumper 445 is installed, then RTCC will read 4 (divide by 2 function), indicating normal transmitter mode wherein a single code is transmitted upon an activation of RF transmitter 400. If jumper 445 is not installed, then RTCC will read 0, and two codes will be transmitted according to the programming of microprocessor 425 in this embodiment.

Next, microprocessor 425 reads the condition of jumpers 450 and 455 at step 515. This is done by the following procedure:

1) Set ports A1, B5, and B4 as outputs, set low;
2) Clear RTCC;
3) Output 4 high pulses on port B5;
4) Turn port B5 off;
5) Output 8 high pulses on port B4;
6) Turn port B4 off; and
7) Read RTCC.

Figure 4:
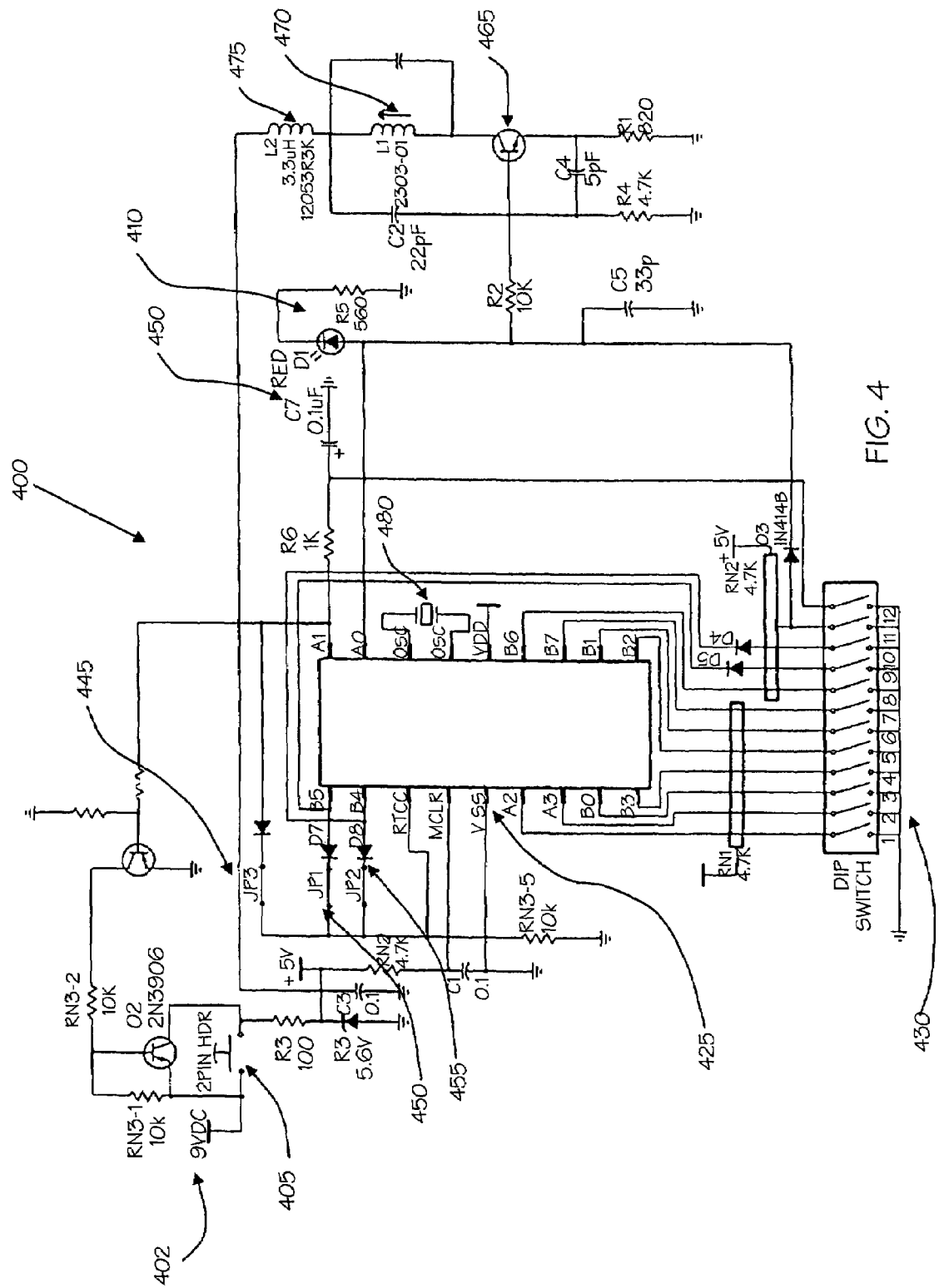
FIG. 4 shows a schematic diagram of the transmitter of FIG. 2.
Figure 5:
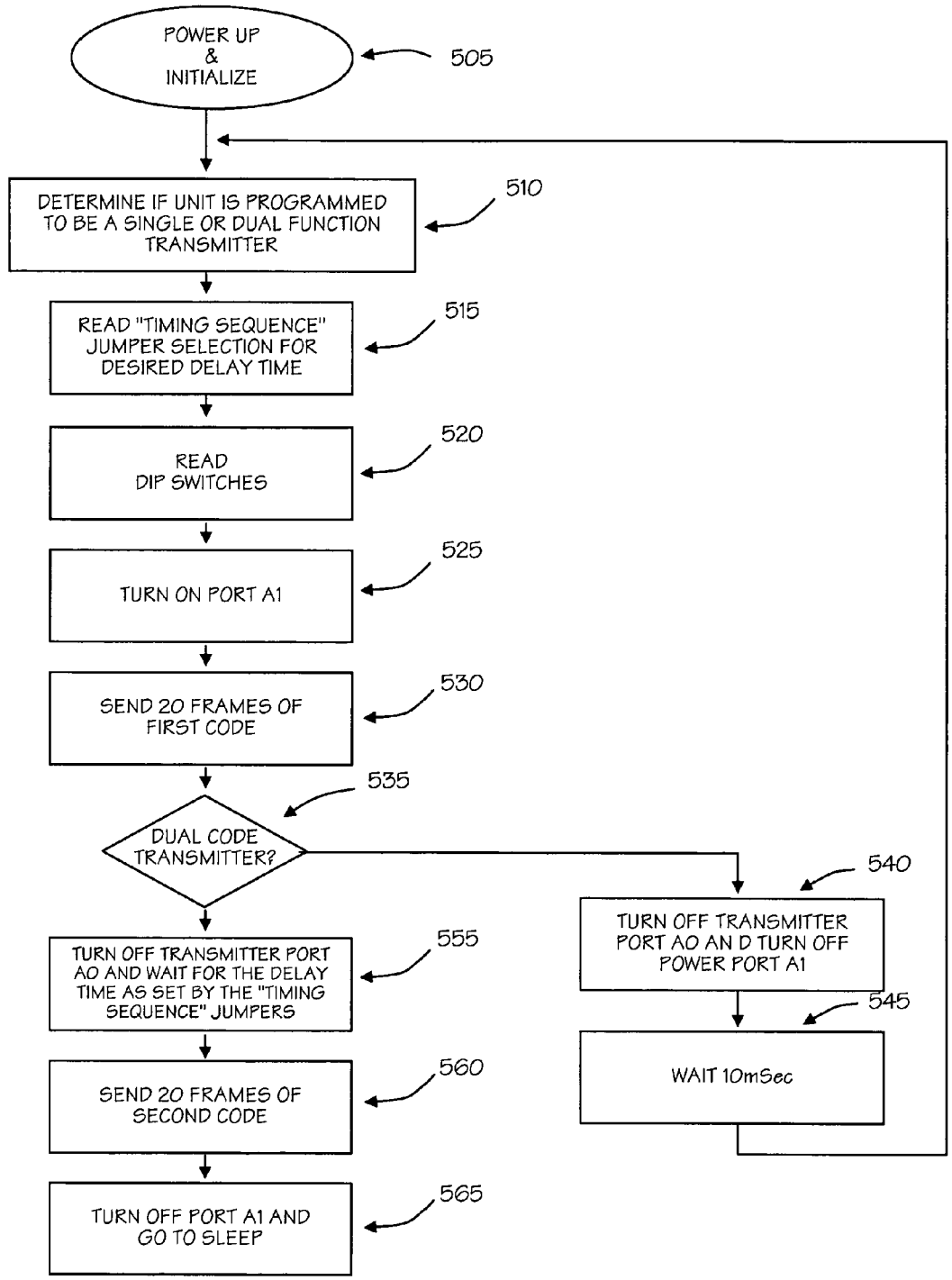
FIG. 5 shows a flow diagram of processes carried out in the transmitter microprocessor.

The value of RTCC (with a divide by 2 function) and associated delay times for various jumper conditions for jumpers 450 and 455 in the embodiment of FIG. 4 are shown in the following table:

| 450 | 455 | RTCC | Time Delay |
|---|---|---|---|
| Out | Out | 0 | 15 seconds |
| Out | In | 2 | 10 seconds |
| In | Out | 4 | 5 seconds |
| In | In | 6 | 0 seconds |

Other delay times and combinations are easily programmed in order to customize the present invention to particular situations as will be recognized by those of skill in the art, these variations being within the scope of the present invention. At the next step in transmitter 400 initialization, microprocessor 400 uses the set positions of switches within DIP switch 430, to determine the code to be transmitted as follows 520:

1) Set all ports to be inputs;
2) Read all ports as high or low with the exception of port A1 (switch 12 of DIP switch 430);
3) Output a "1" on port A1 for 200 μsec;
4) Delay 1-2 μsec;
5) Read port A1 as an input; and
6) Turn port A1 off and allow capacitor 460 to discharge.

DIP switch 430 in this embodiment is a twelve position switch, however other variations, including other DIP switches, can be substituted as is well known to those of skill in the art, the salient feature being the ability to select a code to be transmitted.

At step 525, port A1 is turned on to ensure power is available throughout the transmission sequence. Consequently, even if switch 405 is released after this point, the full transmission sequence or sequences will be completed since port A1 functions as a means for maintaining operating power to RF transmitter 400. Thus, in this embodiment, 20 or 40 complete frames of code will be sent depending on if RF transmitter 400 is in normal or dual function mode as will be described below. In the embodiment of FIG. 4, the preprogrammed time is based on the completion of a predetermined sequence. Those of skill in the art will recognize that any period of time can be preprogrammed, and more or less time may be desired depending on the particular system. Additionally, the preprogrammed time may be effected in a variety of means, such as being controlled by a timer or by the number of frames, these variations being within the scope of the present invention.

As port A1 is connected to switch 12 of DIP switch 430, this switch is not read in the above procedure. The embodiment of FIG. 4 is configured for a frame period of approximately 26 msec. Thus, a minimum of one half second of the desired code will be transmitted by a momentary closure of switch 405. For example, in this embodiment, the total elapsed time from step 505 to step 525 takes 380 μsec. Thus, even a momentary depression of switch 405 results in transmission of a sufficient number of frames for the system to operate normally. Prior art transmitters transmit only while their switch is depressed, leading to a significant number of failed transmissions which forces the individual to re-press the switch. This leads to a delay in operating the door as well as being an irritant to the individual attempting to open the door.

Those of skill in the art will recognize that the above operation has utilized port A1 for three different functions, namely, for determining the position of jumper 445, for determining the condition of switch 12 of DIP switch 430, and for supplying power to the transmitter after switch 405 has been shut. This is possible due to the use of capacitor 460 in conjunction with port A1. Consequently, one is able to apply a voltage to port A1 for a short period of time and determine the condition of switch 12 of DIP switch 430 by the charging of capacitor 460. Once capacitor 460 discharges, Port A1 can be used for another function. Thus, by timing the events and making use of capacitive elements, the present invention has multiplexed these functions such that the potential usefulness of a single port has been tripled.

Returning to FIG. 4, the coded signal corresponding to the setting of DIP switch 430 is coupled from pin AO to the base of transistor 465 to selectively activate the output oscillator to provide a combined carrier and code RF signal transmitted through antenna coils 470 and 475. The output frequency is a function of oscillator 480. In the embodiment of FIG. 4, the carrier frequency is 390 MHz, however, there is no limitation by way of this invention to limit the carrier frequency used.

Concurrent with the transmission of the combined RF signal, LED 410 is energized indicating that data is being transmitted. The first code sent is determined in this embodiment, by a format chart which correlates the actual codes with the DIP switch settings as is well known in the art.

Once the full 20 frames has been transmitted, microprocessor 425 evaluates the mode of RF transmitter 400 which is determined by the condition of jumper 445 (step 535). If only a single code is to be transmitted, then port AO and A1 are turned off 540, de-energizing LED 410 and microprocessor 425, and a 10 msec count down is initiated 545. In the event switch 205 is maintained in the closed position throughout the 10 msec countdown, then the process returns to step 510. The purpose of the 10 msec countdown is to allow the system to settle to avoid undesired repetitive transmissions.

If the transmitter is programmed to be a dual code transmitter 535, then port A1 is not de-energized. Rather, RF transmitter 400 delays for the time delay established by the condition of jumpers 450 and 455 as described above 555. Step 560 is performed at the completion of the transmitter delay, at which time port AO is turned on for the transmission of 20 frames of a second code. The second code is associated with a pseudo value of the initially determined switch settings of DIP switch 430. Specifically, microprocessor 425 creates a pseudo DIP switch setting by inverting in memory the setting of switch 2 of DIP switch 430. This pseudo DIP switch setting is then compared to the format chart and a second code is obtained. The second coded signal is transmitted in the same manner as the first coded signal described above. Upon completion of transmission of the second combined RF signal, ports A0 and A1 are turned off and RF transmitter 400 is de-energized 565. While the embodiment of FIG. 4 utilizes a pseudo DIP switch setting to determine the second code to be transmitted, other means for determining the second code can be used which would be obvious to those of skill in the art, those other means being within the scope of the present invention.

Figure 6:
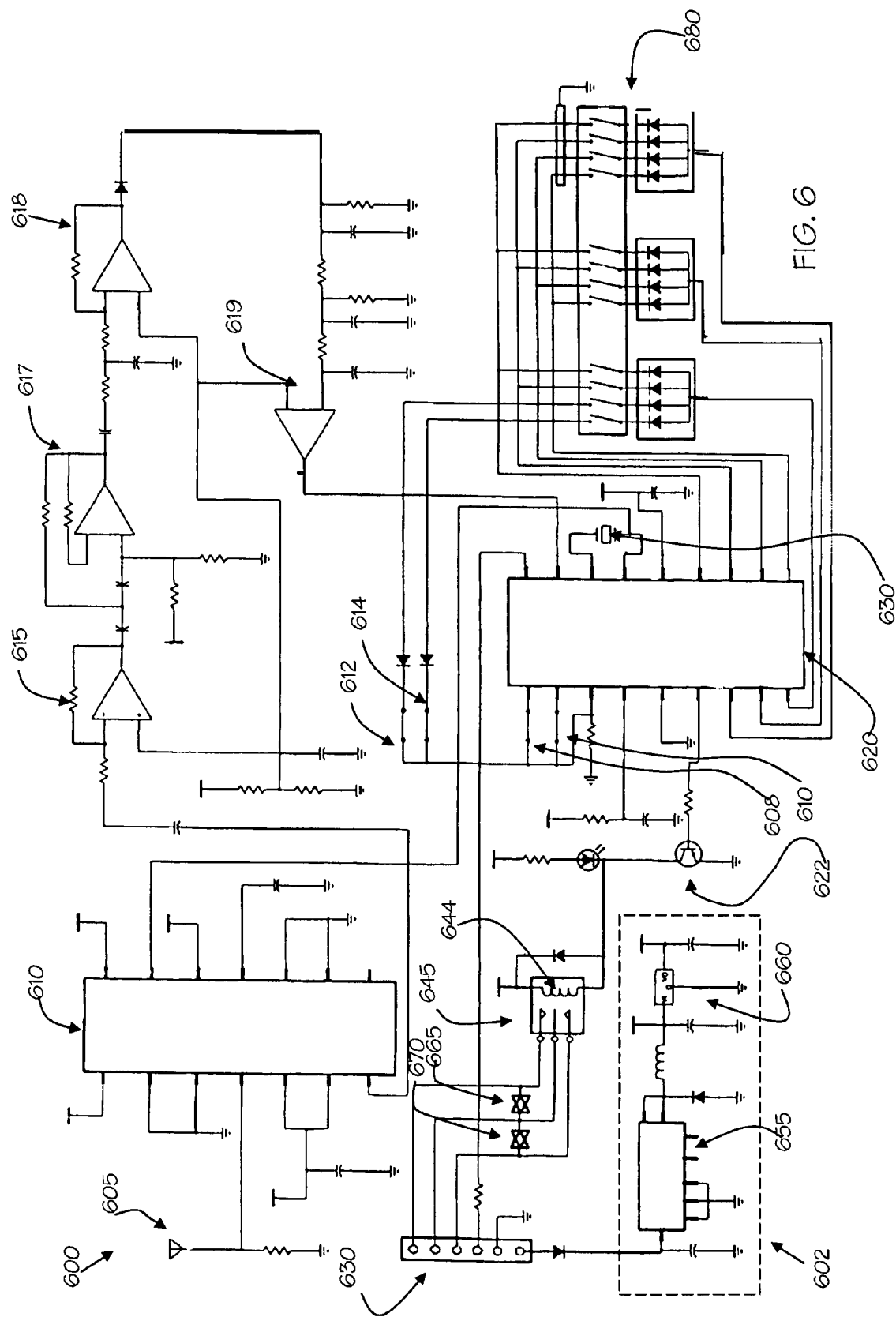
FIG. 6 shows a schematic diagram of the receiver of FIG. 3.
Figure 7:
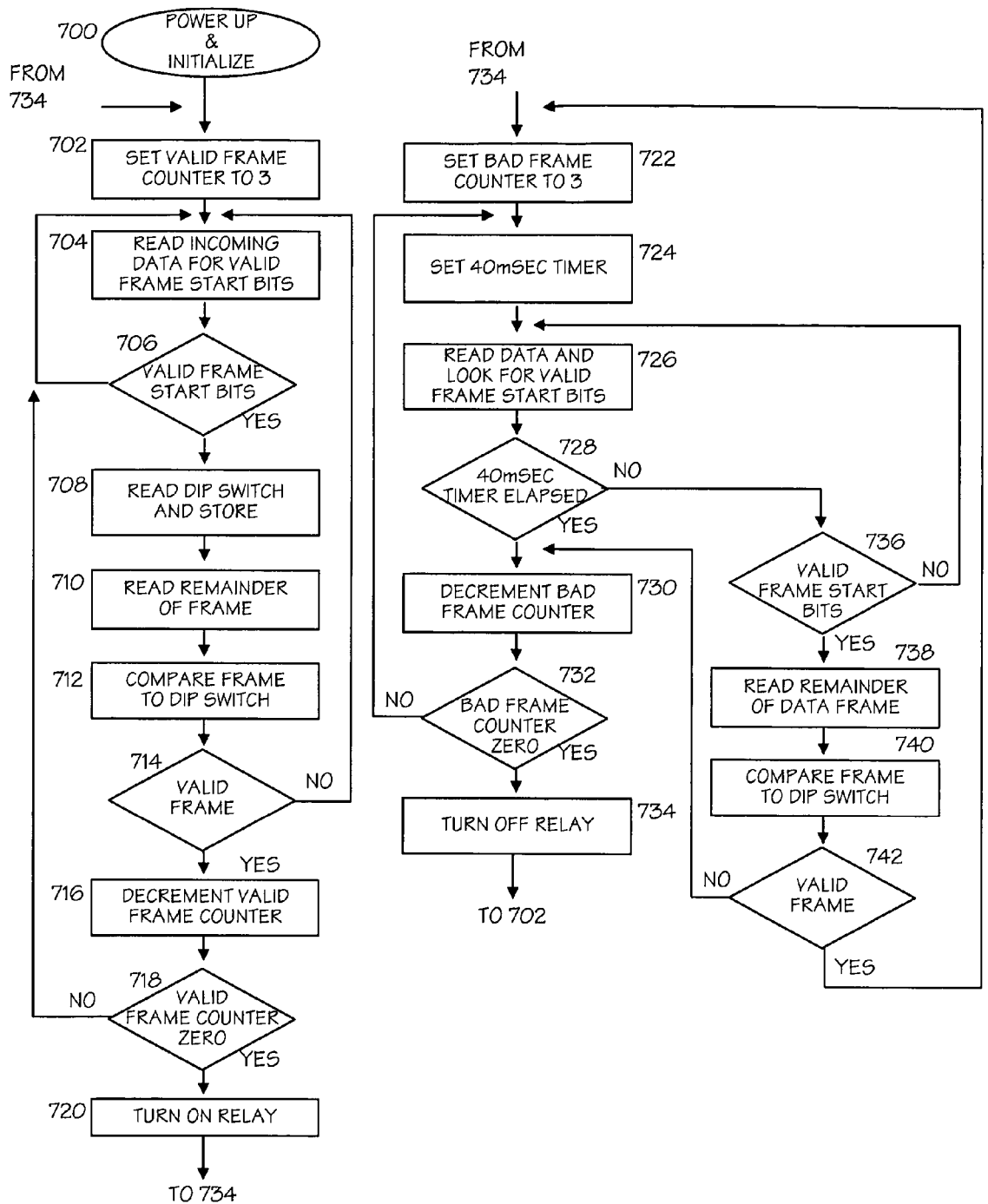
FIG. 7 shows a flow diagram of the process carried out in the receiver microprocessor programmed as a Single Receiver.

Detailed operation of an RF receiver according to the present invention is described by reference to FIG. 6-FIG.11. FIG. 6 shows a schematic diagram of an embodiment of RF receiver 300 of FIG. 3 and FIG. 7 shows a flow diagram of the process carried out in the receiver microprocessor programmed as a single receiver. In its normal condition, RF receiver 600 is powered and initialized in step 700 as shown in FIG. 7. Returning to FIG. 6, initialization occurs when external power is provided to power supply 602 by connecting an external power source to means for operably connecting the transforming means to a power source, which in this embodiment is pin nos. 5 and 6 of harness 650. Power supply 602 in this embodiment is provided by means for transforming power which comprises switching regulator 655, of the type LM2574HV, linear regulator 660 of the type LM2931 and half wave rectifier 679 which is of the type 1 N4002, which are commercially available through National Semiconductor Corporation of Santa Clara, Calif. Switching regulator 655 can accept input power supplies from 12-60 VDC which is within the range of voltage normally available at installation sites, the available power typically being between 12 and 40 V. However, the available power may be AC as opposed to DC. Consequently, power applied to pins 5 and 6 of harness 650 passes through half wave rectifier 679. Thus, both AC and DC power may be used by power supply 602. Switching regulator 655 then regulates that power to 12 volt DC and linear regulator 660 converts the 12 volt DC power to 5 volt DC power. The 12 and 5 volt DC power is supplied to the components of RF receiver 600. Incorporation of the switching regulator into power supply 602 eliminates the need for external power conditioners which are typically needed for prior art receivers. Thus, a minimum number of components are required to be taken to an installation of an RF door activation system, and the time needed to ascertain an appropriate external power supply and to connect the external power supply to RF receiver 602 is minimized. Those of skill in the art will recognize that other switch regulators can be incorporated either in place of or in addition to switching regulators 655 and 660. The salient feature is the capacity to convert the externally available power to the power needed by the components of RF receiver 600 without the need for additional power conditioners external the receiver.

When power is initially applied to RF receiver 600, microprocessor 620 determines the function mode of RF receiver 600 by ascertaining the condition of jumpers 608 and 610 shown in FIG. 6 according to the following procedure:

1) Set port A2 as an output and port A3 as tri-stated or as an input;
2) Clear the RTCC
3) Output eight "1" pulses on port A2;
4) Set port A3 as an output and set port A2 as tri-stated or as an input;
5) Output four "1" pulses on port A3; and
6) Read the RTCC.

The mode of operation of the receiver is determined according to the following table:

| RTCC Count | Mode of Operation |
| --- | --- |
| 6 | Single Receiver |
| 4 | Single Receiver with Extended Output |
| 2 | Dual Receiver |
| 0 | Single Receiver with Paused Dual Output |

Those of skill in the art will recognize that use of jumpers to determine various functions in both the transmitter and the receiver is merely a convenient means of effecting the function. Other mechanisms for modifying the function to be performed include, but are not limited to, actual reprogramming of the microprocessor and addition of chips. These variations and others being within the scope of the present invention.

In "Single Receiver" mode, the receiver will energize relay 645 shown on FIG. 6 when the proper code is received. Once the code is no longer received, relay 645 deenergizes. In this manner, a single utility device can be controlled with either control or operating power provided by relay 645 through harness 650. This mode is useful, for example, when it is desired to provide only a signal to an operating mechanism such as a hydraulic opener. The operating device then proceeds a through a cycle which opens the door, maintains it open for a specified time, and then shuts the door.

"Single Receiver with Extended Output" mode similarly begins with relay 645 being energized upon receipt of the proper code. However, in this mode, relay 645 is maintained energized after the valid code is no longer being received for an amount of time equal to a time extension which can be pre-set by the operator in the manner described below. This mode is useful when operating power is being provided through relay 645, such that the door will open and remain open for as long as relay 645 is energized.

"Dual Receiver" mode operates initially like the "Single Receiver" mode. However, a second code can be received and acted upon by RF receiver 600. RF receiver 600 is programmed to generate a response based upon receipt of a code which is the same code as the first code, with the exception of the setting of DIP switch 2 which is reversed. When the second code is received, port A1 is activated thus acting as a second relay by providing power to pin 4 of harness 650. In this mode, only one code is being received at any given time, and only one relay will be energized at any given time. This mode is useful, for example, when it is desired to operate two sequential doors. The first relay controls a first door, and the second relay controls a second door. Thus, depending on the code received, either the first or the second door will be opened. By transmitting the codes in a sequential manner, an individual can be allowed to pass through both doors while minimizing the time that both doors are open simultaneously. The order of the codes can be reversed in order to allow passage through the doors in the opposite direction.

"Single Receiver with Paused Dual Output" mode operates initially like "Single Receiver" mode. However, once relay 645 has been activated, receiver 600 is programmed to pause one second and then energize port A1, which acts as the second relay as is the case in "Dual Receiver" mode. In this mode, both port A1 and relay 645 are maintained in an energized state for a programmed period of time before deenergizing at the same time. This mode is useful, for example, when a magnetic lock is used on a door. As discussed above, the magnetic lock must be disengaged before attempting to open the door or else the door may jam with the locking mechanism. In this mode, the magnetic lock can be de-energized based on activation of relay 645, and then a door opened based on the activation of port A1.

The receiver time extension for the Single Receiver with Extended Output mode is determined during initialization by microprocessor 620 by ascertaining the condition of jumpers 612 and 614. The jumper condition for jumpers 612 and 614 is read according to the following procedure:
1) Set ports A2 and A3 as tri-stated or as inputs;
2) Set ports B6 and B7 as outputs;
3) Clear RTCC;
4) Output eight "1" pulses on port B6;
5) Output four "1" pulses on port B7; and
6) Read RTCC.

The receiver time extension associated with the jumper condition in this embodiment is as follows:

| 612 | 614 | RTCC | Time Extension |
|-----|-----|------|----------------|
| Out | Out | 0 | 20 seconds |
| Out | In | 2 | 15 seconds |
| In | Out | 4 | 10 seconds |
| In | In | 6 | 5 seconds |

Returning to FIG. 7, the valid frame counter is set to a value of 3 702. RF receiver 600, once initialized, is ready to receive an incoming signal. Signals are detected at varying frequencies in normal operation of RF receiver 600 due to the function of receiver chip 310 which controls the frequency of signals that will be "heard" by RF receiver 600. Receiver chip 310 is a single chip on-off keyed receiver of the type MICRF001 commercially available from Micrel Inc., of San Jose Calif. Receiver chip 310 can be configured to sweep the frequency range of 300 to 440 MHz, which encompasses the frequencies commonly used by RF garage door openers. Consequently, even a transmitter with significantly degraded frequency characteristics for reasons including those discussed above will be within the accepted frequency band of RF receiver 600 during normal operations. This is a significantly useful advantage of the present invention. Although other prior art receivers are capable of being trained to new frequencies, which can be useful in adjusting for certain frequency variances, these transmitters require the receiver to be in "training mode" as described above. Consequently, variances which may occur throughout a day due to, for example, the effect of fluctuating temperature on the transmitter, cannot be readily offset.

Another benefit of receiver chip 310 in this embodiment is that receiver chip 310 is not as sensitive to the presence of metal and other receivers. Prior art regenerative receivers do not function well when in close proximity to other regenerative receivers or metals such as is commonly used in doors for building entrances and exits. This significantly limits the manner in which an automatic door opening system can be incorporated into a new or existing building. However, several receivers comprising receiver chip 310 can be stacked on top of each other and placed on metal without interference in the operation of the receiver. This affords a great number of options in determining the installation to be used in a given application.

Thus, when a signal within a wide range of frequencies is detected by antenna 605 which serves as a means for receiving an incoming signal, it is coupled to receiver chip 610 at pin 4. In addition to tuning antenna 605 to sweep a frequency band of 300 to 440 MHz, receiver chip 610 demodulates the incoming signal to recover the coded signal which is passed out through pin 7. Demodulation can be thought of as the process of stripping the combined signal which has been received into its constituent parts: the carrier frequency, which was needed to carry the coded signal to the receiver; and the coded signal which contains the information which is being communicated to the receiver.

The coded signal passes through gain amplifier 616, high pass filter 617 and low pass filter/amplifier 618 all of which are used to better condition the coded signal for future evaluation by RF receiver 600. The coded signal then passes through comparator 619 to pin AO of microprocessor 620 where the coded signal is evaluated for the presence of valid frame start bits 704.

Figure 8:
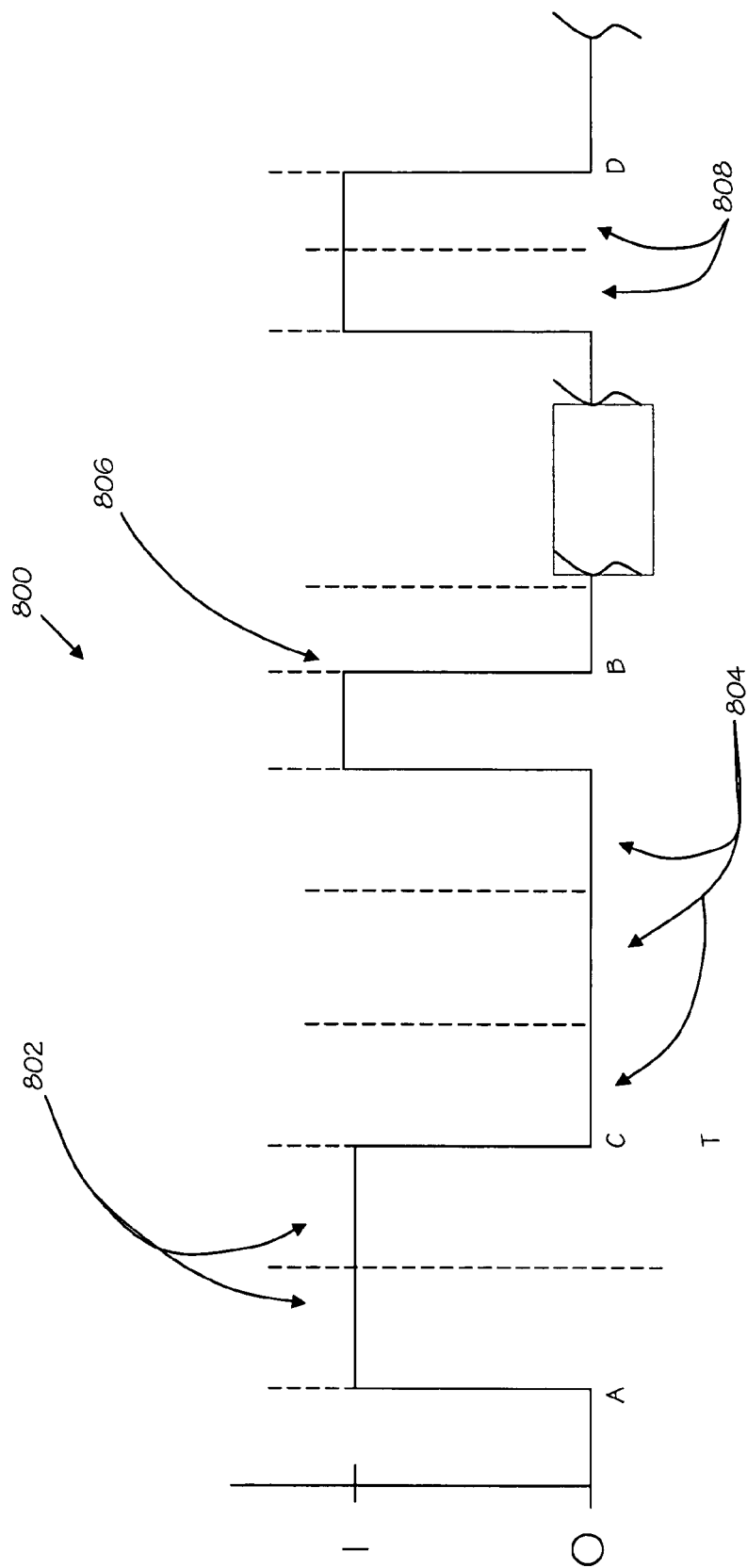
FIG. 8 shows a timing diagram showing a frame starting bit sequence.

Referring now to FIG. 8 a typical frame start bit sequence is shown. Frame start bit sequences are a series of high and low values which are used to indicate to a receiver that a valid signal is being transmitted to the receiver and that the receiver should attempt to determine the message being sent. In a sense, the bit start sequence can be thought of as providing a gatekeeper function, such that signals having bit patterns which do not meet the expected pattern are not further analyzed. In this embodiment, RF receiver 600 is programmed to receive codes in a format such as that commonly associated with commercially available garage door openers manufactured by Genie Company of Alliance, Ohio. Frame start bit sequence 800 begins with two high bits 802, followed by three low bits 804, and ends with one high bit 806. When RF receiver 600 recognizes this series of bits, RF receiver 600 will proceed to determine the information which is being transmitted.

Figure 9:
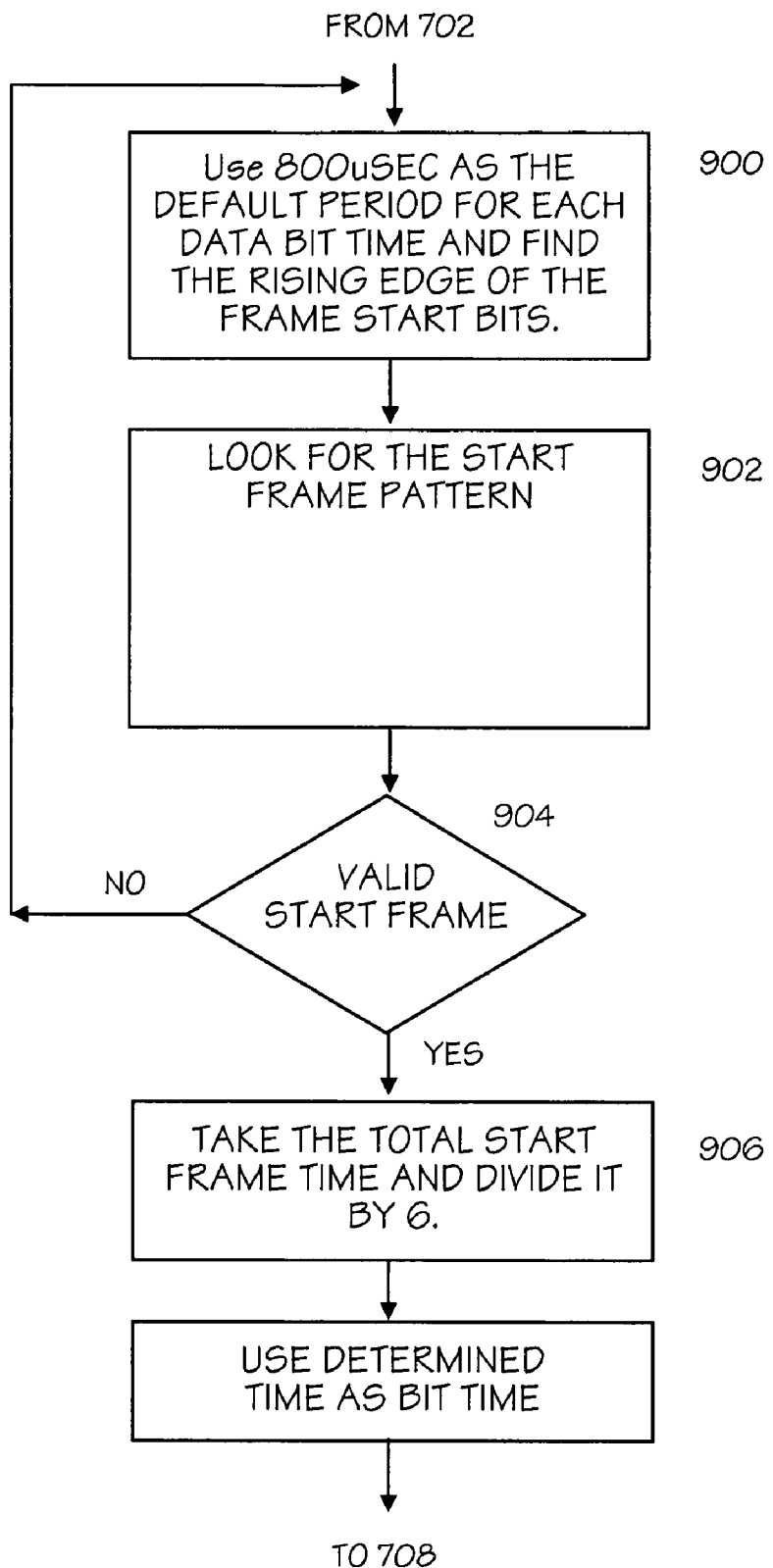
FIG. 9 shows a flow diagram of an embodiment of a frame synchronization process within the process of FIG. 7.

One action which is performed by RF receiver 600 in order to assure correct determination of information being transmitted is a timing calibration which is shown in FIG. 9. An initial reference bit timing is established for RF receiver 600 using crystal 630 which in this embodiment provides a 3 MHz reference signal. To function with a signal such as a signal associated with the frame start sequence of FIG. 8, RF receiver 600 is initially programmed to use 800 μsec as a default bit period since the code associated with Genie garage door openers typically has a bit period of 800 μsec 900. A bit period is simply the duration a particular bit is transmitted. This is also referred to as bit timing. In FIG. 8, each bit period is indicated by a dashed line. However, as previously discussed, transmitter characteristics may be degraded. Consequently, the transmitted bit period may be, for example, 700 μsec instead of the expected 800 μsec. The difference in period between the design period and the transmitted period is a timing error. Additionally, the receiver will have some timing errors which may exacerbate or ameliorate the errors of the transmitter. Ultimately, it is the total timing error of the system which is of concern in ensuring proper communication between the transmitter and the receiver.

Certain design characteristics of the system help to minimize the effects of system timing errors. For instance, a receiver samples the data bit a number of times during the bit period. A bit value is determined once the sampling achieves a preset percentage of consistent returns. For example, a bit of 800 μsec could be sampled once every μsec. In this example, a threshold of equal to or greater than 60% is established for the system. Thus, when 480 samples returned the same value, such as a "1", the system would determine that the intended bit value was "1". Therefore, even if the transmitter and receiver have differing bit timing, they can still communicate with each other. However, errors due to differences in timing are additive.

The additive nature of timing errors is readily understood by continuing with the above example. The first transmitted bit was 700 μsec long. Then, the second bit was transmitted. However, the receiver does not expect the second bit to begin until 800 μsec have elapsed. Thus, the first 100 μsec of the second transmitted bit are sampled, but the returned value is counted as part of the first bit by the receiver. Since only 480 samples were needed to establish a bit value, the first bit is not affected by this timing error. However, there are now only 600 μsec for the receiver to correctly determine the value of the second bit, before the third transmitted bit will be received. In this example, by the fourth bit, the receiver and transmitter are on the same bit for only 400 μsec. Consequently, the receiver cannot achieve 480 valid samples by the fourth bit.

Returning to FIG. 9, in this embodiment of the invention, the threshold is set at 68%. Thus, for a signal devoid of other errors and barring other corrective features, a transmitter's timing must be within 42.6 μsec of the timing of the receiver in order to ensure a valid frame start sequence (6 bits of data) is received 902. This results in at least 544 μsec of valid signal available for sampling by the sixth bit of the frame start sequence.

The threshold selected is a function of desired system performance characteristics which infer various system design criteria. For example, in a system wherein it is desired to maximize the security of the system, a very high threshold may be selected. Consequently, while the system may fail to correctly recognize some valid signals, virtually all false signals will be rejected. Conversely, if security is not an issue, then a lower threshold may be set, thus maximizing the number of valid signals that will be recognized.

Of course, other factors will influence the selection. For example, in an environment with background RF signals, some interference with the intended signal can be expected. Thus, in order to maintain a desired level of system performance when a valid signal is transmitted, the threshold is lowered. In a pristine RF environment, with no background RF interference, the threshold can be raised while maintaining the desired system performance. Thus, while the threshold in this embodiment is 68%, other thresholds may be selected based on desired system design parameters as is well known in the art.

To determine if a received group of bits constitutes a valid frame start sequence, the received pattern is compared to the standard pattern shown in FIG. 8. Thus, microprocessor 620 provides the means for determining if the time difference is valid for further use since invalid frames result in a return to step 900. Once a valid frame start sequence is received 904, the present invention adjusts the receiver timing based on the frame timing of the transmitter which is exhibited in the frame timing of the received signal. This is accomplished in one embodiment by noting the time that the rising edge of the frame start sequence was received which correlates to point "A" on FIG. 8. Next, the time that the falling edge is detected on the last data bit, which correlates to point "B" on FIG. 8, is noted. The time interval from "A" to "B" is divided by six to determine the transmitter's bit timing 906. RF receiver 600 then uses the transmitter's bit timing as determined above (908) in estimating the time that future bits will arrive as is described below. Thus, the frame timing of the receiver is effectively adjusted to more closely resemble the frame timing exhibited in the received signal. The means for adjusting frame timing of the receiver in the embodiment of FIG. 6 is microprocessor 425.

The above method of adjusting receiver frame timing is extremely useful typical frame for an RF garage door opener is 32 bits. In order to achieve a 68% threshold over 32 bits, the maximum allowed timing error would be only 8 μsec. This is an unacceptably small error budget for a transmitter which can be easily damaged, subjected to freezing temperatures, or which might have a degraded battery. While the threshold can be adjusted to a lower value, the potential for erroneous opening of a door increases as the threshold is lowered. Therefore, it is desirable to eliminate timing errors by adjusting the timing of the receiver to better match the timing of the transmitter as described above.

Those of skill in the art will appreciate that numerous alternatives exist for determining frame timing of an incoming signal within the context of the present invention. For example, with the sequence shown in FIG. 8, one could merely use the period of one high bit 806. The time difference between the time the rising edge of bit 806 is detected and the time the falling edge of bit 806 is detected can be associated with a frame timing of the incoming signal by multiplying the time difference by the number of bits in the frame. Alternatively, one could use the time associated with three low bits 804 and divide by three to get a bit period from which the frame timing can be calculated.

Many other alternatives exist for the code associated wit FIG. 8 as well as codes associated with other commercially available systems. For example, the time difference between a known feature of two or more consecutive frames could be used to determine frame timing. Thus, the means for determining frame timing of a received signal comprises a means for detecting signal characteristics such as a standard bit format and a means for associating time with those signal characteristics according to methods well known in the art. The salient feature of timing calibration of the present invention is the use of known or readily determined signal characteristics of the transmitted signal to determine how to change the receiver timing in order to better match the timing of the receiver and received signal. This will normally utilize a time difference and the manner in which association of the time difference with the frame timing of the incoming signal is done will vary according to the signal characteristics used. For example, in some instances, a counter may be used while in other circumstances time stamping of the information may be used. These and other variations being within the scope of the present invention.

With the above discussion, it will now be obvious to those of skill in the art that a number of embodiments exist for the means of determining if the time difference is valid for use in adjusting frame timing of the receiver. For example, a range of acceptable time differences may be stored within microprocessor 620. Then, when the time difference is determined, it will be assessed as being valid or invalid by comparison with the stored range of acceptable time differences. In the embodiment of FIG. 6, a range of 700-900 sec per bit is used by microprocessor 620, thus serving as a means for determining if the time difference is valid. While in this embodiment there are two different means for determining if the time difference is valid, both involving microprocessor 620, the scope of the present invention includes the use of a single means for determining if the time difference is valid.

Additionally, a number of alternative time differences can be used, all being within the scope of the present invention. For example, one approach is to use a time difference based on more than one frame start sequence. In these scenarios, the time difference can be related to the number of frames between the first frame and the last frame used. If the receiver "misses" a frame and uses a later transmitted frame, and thus establishes an erroneously large time difference, the range of acceptable time differences can be useful in eliminating the erroneous time difference from use. In like manner, a range of acceptable time differences may be defined by a range of frame times which are acceptable. These and other variations are within the scope of the present invention.

Returning to FIG. 7, RF receiver 600 next determines the setting of DIP switch 680 switches 708. DIP switch 680 switch settings are determined according to the following procedure:
1) Set ports A2 and A3 as tri-stated and ports B4, B5 B6 and B7 as inputs;
2) Set ports B2 and B3 as outputs, set low;
3) Set port B1 as output, set high;
4) Directly read switches 1, 2, 3 and 4;
5) Set port 131 to low, set port B2 to high;
6) Directly read switches 5, 6, 7 and 8;
7) Set port B2 to low, set port B3 to high; and
8) Directly read switches 9, 10, 11 and 12.

The settings of DIP switch 680 are stored so that they may be used in validating the received coded signal. Next, the remainder of the data frame, the frame start sequence of which was used to establish bit timing, is read 710.

Figure 10:
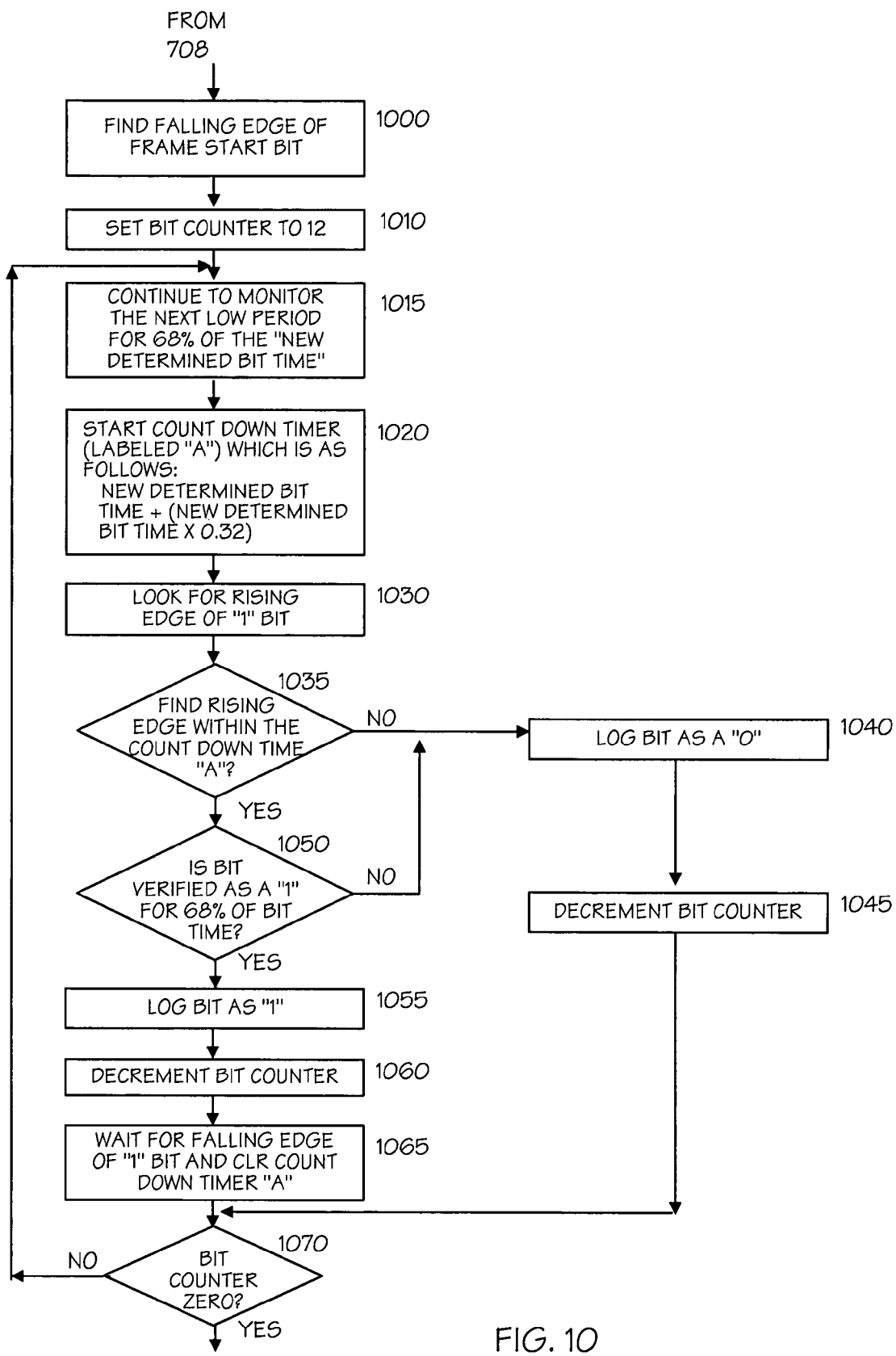
FIG. 10 shows a flow diagram of the data reading process within the process of FIG. 7.

Referring to FIG. 10, the process of reading data bits for this embodiment is described. First, the falling edge of the last frame start bit, which correlates to point B of FIG. 8, is established 1000 and a bit counter is set to twelve 1010. Next, the process is delayed for a time equal to 68% of the above determined bit time 1015. A count down timer is then set to an initial value equal to 132% of the above determined bit time and started 1020 and the received coded signal is monitored for a rising edge of a "1" or "high" data bit 1030.

The reason for this delay is explained by reference to FIG. 11 which shows an example of a portion of a coded frame in a Genie format. The portion of the signal between points "A" and "B" represents the frame start sequence which is shown in FIG. 9. The format of this code is such that after the last bit of the starting sequence, represented by bit 1110, and after every data bit, such as bits 1115, 1120 and 1125, the coded signal has an interleaved zero for a duration of time equal to the bit time. In other words, the code which was determined by RF transmitter 400 using DIP switch 430 switch settings is transmitted in every other bit. The bits containing the actual code are data bits. The bits between the data bits containing the code are always a "0" or "low" bit which can be thought of as a null in the coded signal. After this null transmission, the next data bit is transmitted. Consequently, the delay in the process is used to ensure that the previous data bit transmission has been completed and the zero transmission is being received. At this point, receiver 400 begins monitoring for the next data point before the expected arrival of the signal to ensure the data is captured. This process increases the probability that a "1" or "high" data bit will be captured. The rationale behind this approach is further discussed below.

Returning now to FIG. 10, if no rising edge of a data bit is detected within the count down time which, as discussed above, is 132% of the determined transmitter timing, then the data bit is logged as a "0" 1040 and the bit counter is decremented 1045. If a rising edge is detected, then the signal is monitored to determine whether the "high" signal is present for 68% of the established bit time 1050 indicating a true "1" or "high" bit as opposed to spurious energy interfering with the transmitted signal. If the threshold is not met, then the bit is logged as a zero 1040 and the bit counter is decremented 1045. In both of these cases, if the bit counter is not at zero, the system returns to step 1015 and continues to monitor the signal for a rising edge of a "1" or "high" data bit 1070.

If the 68% threshold is met, then the bit is logged as a "1" or "high" data bit 1055 and the bit counter is decremented 1060. Those skilled in the art will realize that according to this method, monitoring the signal during zero transmission does not adversely impact the threshold for determining if a "1" is being transmitted. In other words, the threshold of 68% is based on the bit time, not on the 132% of bit time that the signal is monitored to determine if a "1" is present. Of course, there is no impact on logging a zero since a data bit of zero is determined only by the count down timer timing out. In effect, a "1" or "high" data bit is only logged when a data bit is positively indicated by the received signal whereas a "0" or "low" data bit is logged by default. Consequently, monitoring for a "1" or "high" data bit during the null does not artificially increase the probability of logging a "0" or "low" data bit nor does it decrease the probability of recognizing a "1" or "high" data bit. Rather, this approach maximizes the probability that the coded data bits actually transmitted are recognized by the receiver.

Figure 11:
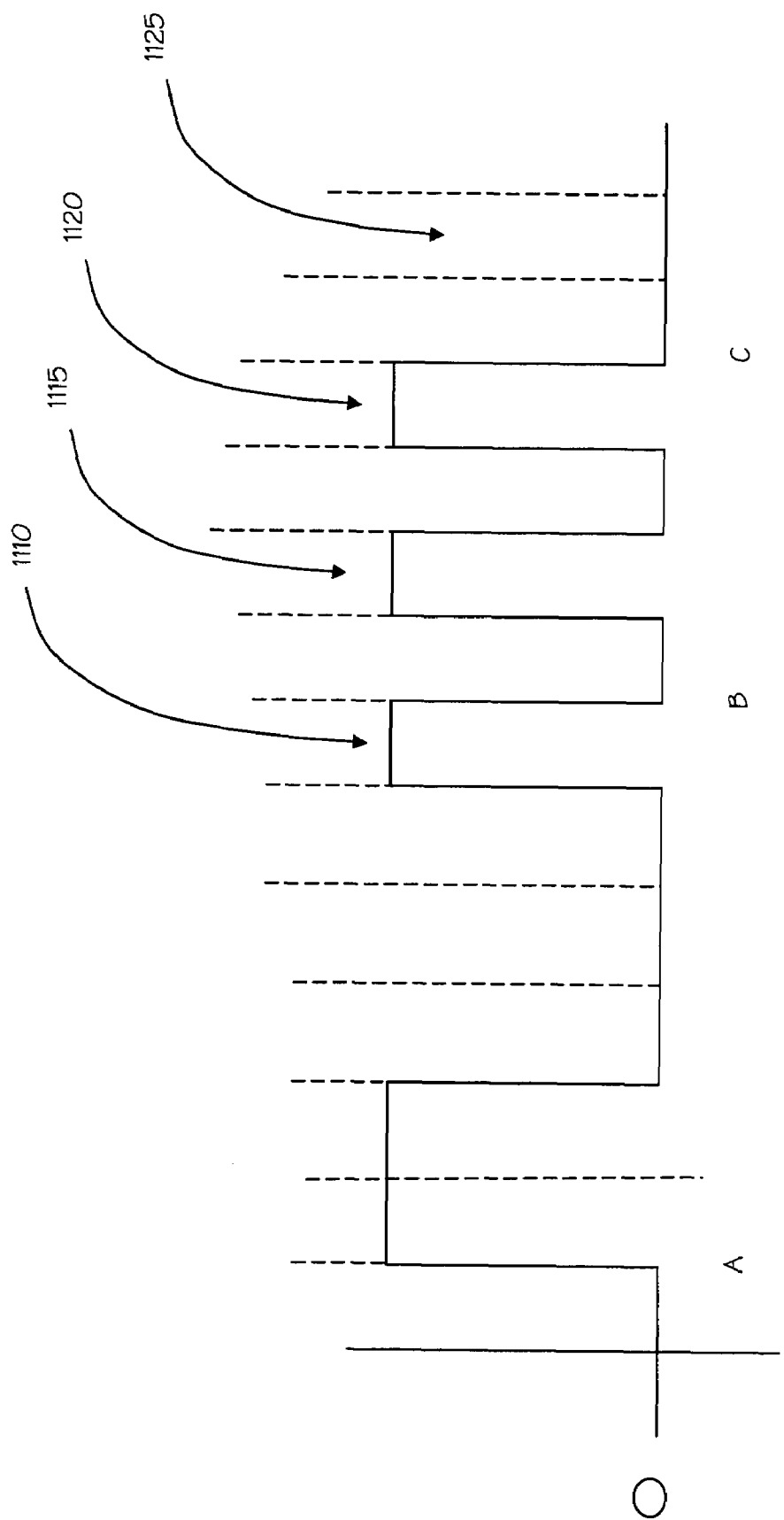
FIG. 11 shows a timing diagram of a portion of a code frame.

Returning again to FIG. 10, the system next monitors the data bit until the failing edge of the "1" bit is detected which is shown in FIG. 11 as the time correlating to point "C" for data bit 1125. Once the falling edge is detected, the count down timer is cleared 1065. This effectively re-synchronizes the receiver with the incoming signal. Consequently, if the bit counter is not at zero and the system continues to monitor the signal for data bits 1070, any bit timing errors which may have been accruing in the system are removed thus minimizing errors in detecting further data bits. This is yet another example of how the present invention is superior to the prior art in minimizing the effects of degraded transmitter timing such that valid coded signals are recognized and acted upon by the receiver of the present invention. Those of skill in the art will recognize that the format of the above example maximizes the number of re-synchronizations that will occur. However, the present invention may be applied to other formats since any code will have a feature which may be used to re-synchronize the transmitter and receiver, thus reducing bit timing errors. For example, in a coded signal comprising the data set 11001010 (which excludes the frame start bit sequence) with no null between the data, the second and third "1" may be used to re-synchronize the system. Alternatively, the rising edge of the fifth and sixth "1" may be used to re-synchronize the system. Thus, a means for reducing bit errors comprises the detection of a particular characteristic of a received signal wherein that characteristic is known to occur at a particular point in a frame, and resetting the receiver timing based on that characteristic. Those of skill in the art will recognize that the present invention may be applied to a variety of formats, those applications being within the scope of the present invention.

Further, while in the present embodiment a count down timer is used, those of skill in the art will recognize that a number of alternative embodiments exist within the scope of the present invention such as, but not limited to, a timer which starts at zero and counts up, or using actual time. The salient feature of the element is that a nominal value can be established, for example by setting a counter to zero or to 132% of bit time or by noting the actual time, and then the desired time counted, such as 132% of bit time in this embodiment.

Resynchronization of the transmitter and receiver in the above discussion occurred after the incoming signal had been evaluated to have a valid start frame. Those of skill in the art will recognize that resynchronization according to the above embodiment may occur during evaluation of the signal for a valid start frame. An embodiment of a receiver incorporating resynchronization in assessing an incoming signal for a valid start frame is discussed in reference to FIG. 9A. In this embodiment, RF receiver 600 is programmed to use 800 μsec as a default bit period 922 and the threshold for determining a valid bit is set at 50%. Once two consecutive "1" bits are received 924, microprocessor 620 waits for up to 1600 μsec from the leading edge of a first "1" bit, which is point "A" of FIG. 8, to detect the falling edge of the second "1" bit which is point "C" of FIG. 8. If a falling edge is detected within this period 926, then a 32.76 msec time out timer is set 928. This effectively resynchronizes the receiver to the transmitter in cases where the transmitter bit timing is faster than that of RF receiver 600. In this embodiment, no resynchronization is effected for bit timing greater than 800 μsec, thus, at the end of 1600 μsec 926, a 32.76 msec out timer is set even if the falling edge of the "1" bit is not sensed 928.

In this embodiment, RF receiver 600 waits for the receipt of two consecutive "1" bits 808 in the following frame 930. In this example, the incoming signal has 32 bits. Thus, if the falling edge is detected within the 32.76 msec time established by the time out timer 932, then microprocessor 620 establishes the bit timing of the received signal by dividing the time which has been counted by the frame timer by "32" 934.

RF receiver 600 in the above example will determine a bit timing for an incoming signal having a bit timing from 600 to over 1010 μsec. However, bit timings greater than 100 μsec away from the design bit timing of 800 μsec may not be valid signals.

Figure 9A:
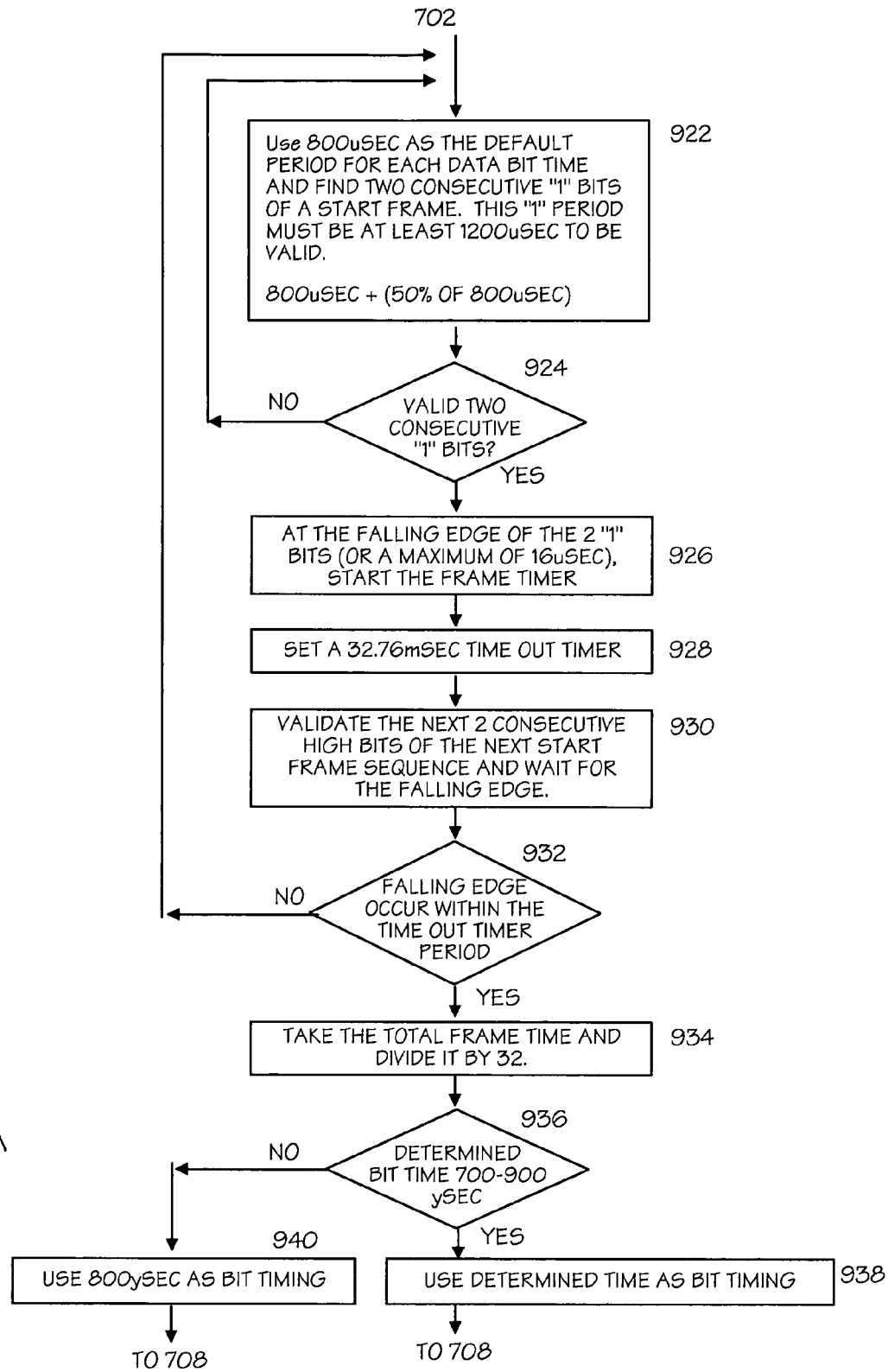
FIG. 9A shows a flow diagram of an alternate embodiment of a frame synchronization process within the process of FIG. 7.

Consequently, in the embodiment of FIG. 9A, microprocessor 620 verifies that the determined bit timing is within a window of 700-900 μsec 936 before using the determined value 938. If the determined bit timing is outside of that window, microprocessor 620 continues to use 800 μsec as the bit timing for the incoming signal 940. The determined bit timing or 800 μsec is then used in the manner described above.

Obviously, the embodiment of FIG. 9A does not eliminate all timing errors as some error is introduced for any signal having a bit timing of greater than 800 μsec due to the starting of the frame timer at step 926 before the falling edge of the incoming bit, point "C" of FIG. 8, is detected. The errors thus introduced are relatively minor, especially in an embodiment utilizing a resynchronization feature, however, even these errors could be minimized with minor modification of the invention if needed or desired in a particular application.

Referring once again to FIG. 7, once the bit counter reaches zero, then the code associated with the stored DIP switch settings determined at step 708 is compared with the received code 712 to determine if the code, and hence the frame, is valid 714. Detection of a valid frame causes the frame counter to be decremented 716. Once enough valid frames are detected, three in this example, the appropriate activation sequence is initiated 720 and an output signal from microprocessor 620 is used to activate transistor 622. When transistor 622 is activated, a circuit is completed through coil 644 of relay 645, thus activating relay 645. This causes the normally closed contact of relay 645 associated with pin 1 of harness 650 to open and closes the normally open contact of relay 645 associated with pin 3 of harness 650. Thus, a utility device can be either activated or deactivated depending on the application. Power is thus supplied from relay 645 through pins 1, 2 and 3 of harness 650, either when relay 645 is activated or when relay 645 is not activated depending on the application, to an external utility device such as door operator 340 or magnetic lock 330 of FIG. 3.

When external devices which produce an inductive voltage spike when their state is changed are controlled, means for surge suppression which in this embodiment comprises surge suppressors 665 and 670 are provided to protect RF receiver 600 from the voltage spike. Surge suppressors 665 and 670 are of the type ZNR such as are commercially available through Panasonic Industrial Company of Secaucus, N.J. Those of skill in the art will recognize that the incorporation of surge suppressors such as surge suppressors 665 and 670 and the like provide a significant advantage over prior art receivers with no internal protection from inductive voltage spikes. No additional equipment need be installed with the present invention thus minimizing the time spent making connections and the space needed to mount a receiver.

When RF receiver 600 is in Single Receiver mode, relay 645 is maintained in an energized condition until the code is no longer received. This is shown in the process on FIG. 7 commencing at step 722 where the bad frame counter is set to 3. A 40 msec timer is then initiated 724 as RF receiver 600 continues to read data and look for valid frame start bits 726. If the timer times out, then no valid frame has been received within the 40 msec 728. Consequently, the bad frame counter is decremented 730. Once three consecutive 40 msec increments have been counted without receiving a valid frame 732, relay 645 is de-energized 734 as RF receiver 600 continues to monitor for a valid frame 702.

If before the 40 msec timer times out valid frame start bits are received 736, then the rest of the frame is read 738 and compared to the code associated with the stored DIP switch settings 740. If the frame is not valid, then the bad frame counter is decremented 730 and the process continues at step 732. If the frame is valid, then RF receiver 600 resets the bad frame counter to 3 722 and the process continues at step 724.

Figure 12:
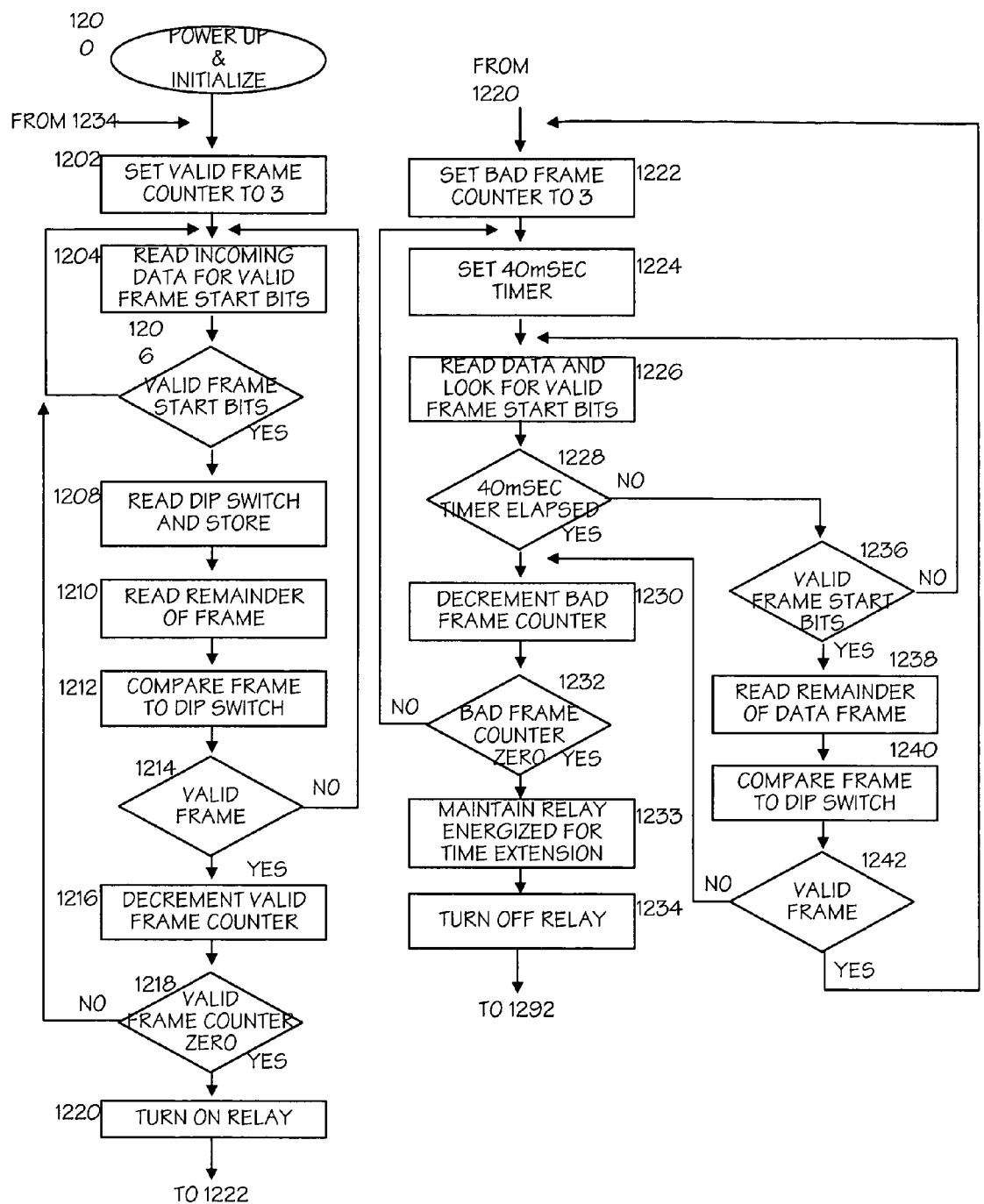
FIG. 12 shows a flow diagram of the process carried out in the receiver microprocessor programmed as a Single Receiver with Extended Output.

The process for Single Receiver with Extended Output mode is similar to Single receiver mode. The difference is shown on FIG. 12. After the bad frame counter has reached zero in the manner described for Single Receiver mode 732, RF receiver 600 maintains relay 645 energized for the time extension set and read in the manner described above 733 before de-energizing relay 645 734.

Figure 13:
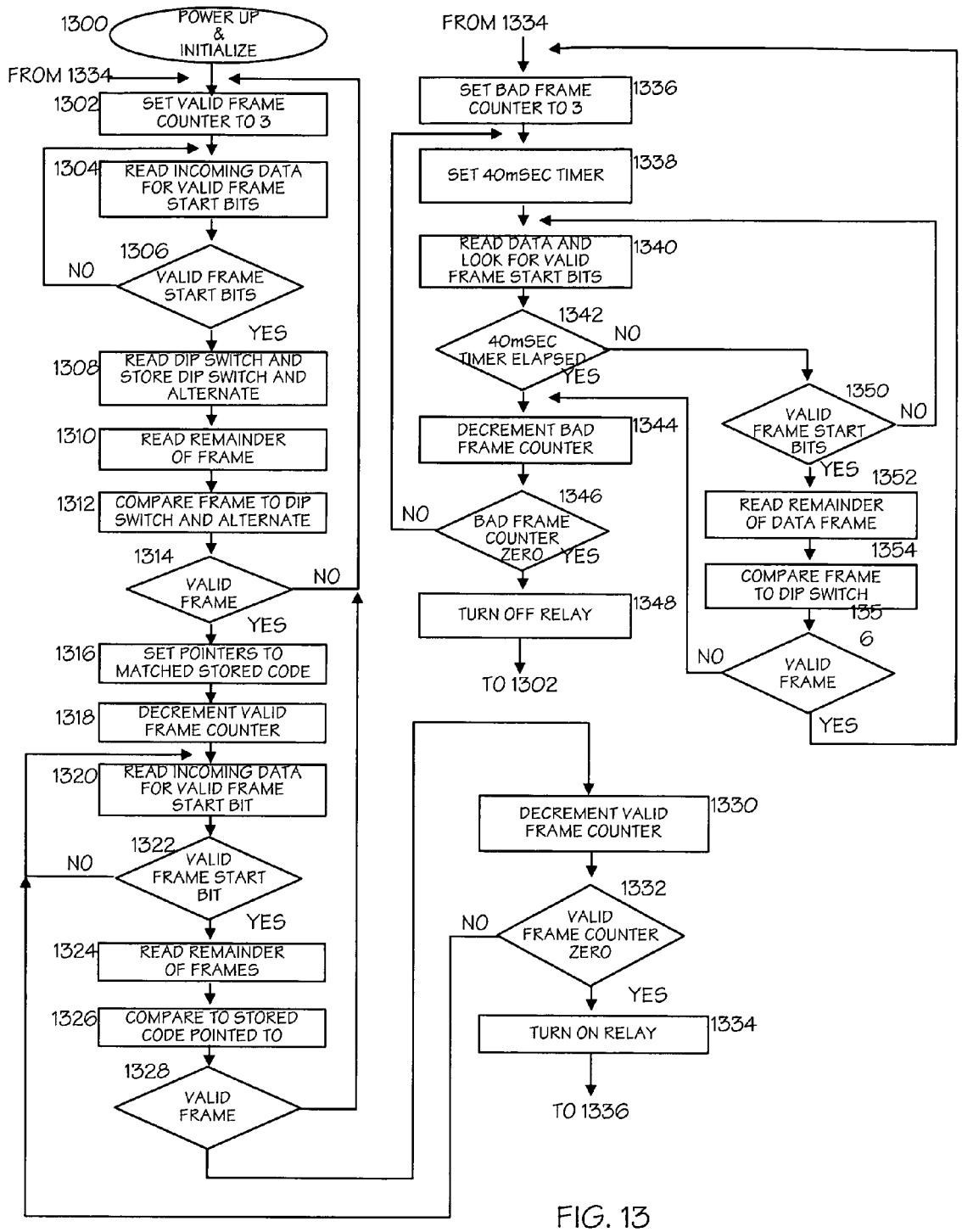
FIG. 13 shows a flow diagram of the process carried out in the receiver microprocessor programmed as a Dual Receiver.
Figure 14:
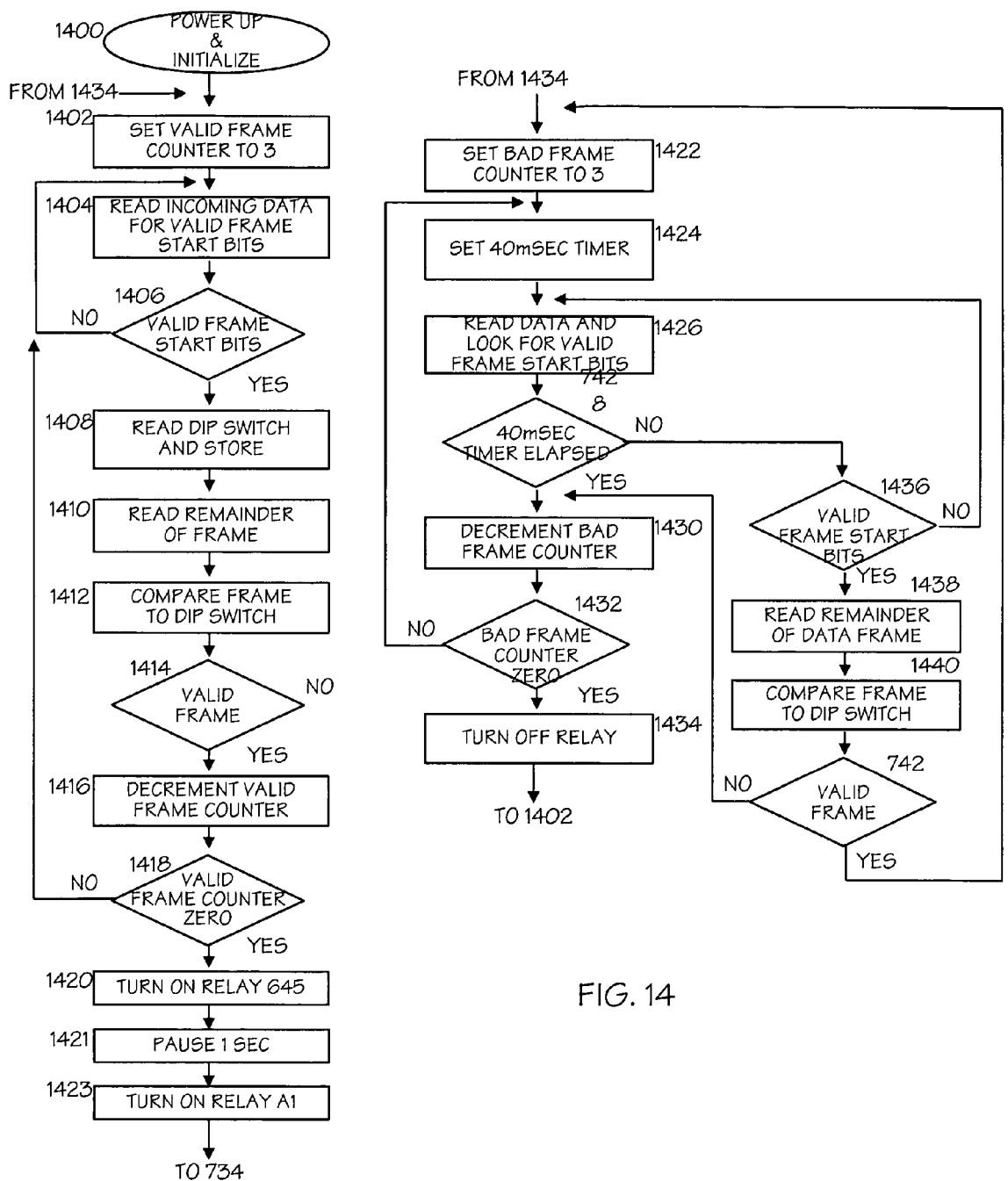
FIG. 14 shows a flow diagram of the process carried out in the receiver microprocessor programmed as a Single Receiver with Paused Dual Output.

Dual Receiver mode initially follows the same general process as Single Receiver mode. However, the operations performed by RF receiver 600 are significantly different. Referring to FIG. 13, the differences in operation are shown. Specifically, when DIP switch 680 switch settings are stored 1308, pseudo DIP switch settings, determined as described above for settings of RF transmitter 400 DIP switch 430 associated with the second transmitted code, are also stored 1308. Consequently, when a comparison is made with the received frame, both the code associated with DIP switch 680 and the code associated with the pseudo DIP switch settings are compared to the received frame to determine if a valid frame has been received 714. Once a valid frame (ie. a coded signal matching one either the code associated with DIP switch 680 settings and the code associated with the pseudo DIP switch settings) is received, the matching code is selected for future comparison 1316. The valid frame counter is decremented 1318 and the incoming signal is monitored for more valid start bits 1320. Once another valid frame start bit sequence is received 1322, the remainder of the frame is read 1324 and compared to the code which was previously matched 1326. Once at least three consecutive frames having valid frame start bits match the stored/selected code, the relay associated with the matched code is activated 1334. In this mode, even though a frame matches one of the two codes, if that code is not the selected code at 1316, it is treated as an invalid code until the process returns to step 1312. The rest of the process in Dual Receiver mode follows the same process as described in Single Receiver mode steps 722 through 742.

Single Receiver with Dual Output and Pause mode is the same as Single Receiver mode except that after the valid frame counter reaches zero 1418, and relay 645 is energized 1420, a pause of one second occurs 1421 and then a second relay A1 is energized 1423. Further, at step 1434, in addition to relay 645 being de-energized, relay A1 is de-energized 1434.

The above description and examples have focused on specific applications in describing the advantages of the present invention. Yet, there is a broad range of applications in which the present invention is useful. Thus, the variations in buildings which are desired to be retrofitted with door activation systems are too numerous to list, each building having its own peculiar layout of doors, devices, available power sources, external architectures, etc. Further, inclusion of door activation systems in new construction have the same variables. Finally, the opening and closing characteristics desired will vary from application to application. Further, there will be certain obvious variations to the examples of operation given such as programming of the invention to operate with transmitters of differing frequencies and differing protocols. These applications and variations are within the scope of the present invention.

The invention herein described provides a significant advantage over the prior art systems. The present invention is readily adaptable to a variety of retrofit applications. It is useful with inexpensive transmitters, compensating for wide frequency and timing variations. The capability to re-calibrate bit timing and re-synchronize with an incoming signal allows the use of transmitters with a broad range of frequencies and frequency drift errors without the need to train the receiver. The system comprises elements which eliminate the need to wire and place external devices such as power conditioners and surge protectors. Finally, the variety of transmitter and receiver operating modes allows for creative and efficient solutions to most door activation challenges. Those of skill in the art will recognize that these significant benefits and others are provided by the present invention.

What is claimed is:

1. A receiver for a door activation system, the receiver having frame timing, the receiver comprising:
   means for receiving an incoming RF signal;
   means for determining frame timing of the incoming signal; and
   means for adjusting the frame timing of the receiver to be closer to the frame timing of the incoming signal, wherein the incoming signal comprises at least a first and a second frame and wherein the means for determining frame timing of the incoming further comprises:
   means for determining the time difference between the receipt of the first frame and the second frame of the incoming signal;
   means for determining frame timing of the incoming signal based on the time difference;
   means for determining if the time difference is valid for use in determining frame timing; and
   means for rejecting non-valid time differences, such that receiver frame timing is not adjusted based on invalid time differences, and wherein the first frame and the second frame comprise a first frame start bit and a second frame start bit respectively, the first and second frame start bits each having a falling edge, and wherein the means for determining time difference between the receipt of the first frame and the second frame comprises:
   means for detecting the falling edges of the first and second frame start bits, such that the time difference is determined by the time difference between detection of the falling edge of the first frame and detection of the falling edge of the second frame.

2. A receiver for a door activation system, the receiver having frame timing, the receiver comprising:
   means for receiving an incoming RF signal;
   means for determining frame timing of the incoming signal; and means for adjusting the frame timing of the receiver to be closer to the frame timing of the incoming signal, wherein the incoming signal comprises a frame start bit sequence of at least two bits, the frame start bit sequence having a rising edge of a bit and a falling edge of a bit, and wherein the means for determining frame timing comprises:
   means for detecting the rising edge of the frame start bit sequence;
   means for detecting the falling edge of the frame start bit sequence; and
   means for determining the time difference between the rising edge and the falling edge, such that the frame timing of the receiver is adjusted based on the determined time difference.

3. The receiver of claim 2, further comprising:
   means for determining if the time difference is valid for use in determining frame timing; and
   means for rejecting non-valid time differences, such that receiver frame timing is not adjusted based on invalid time differences.

4. A method of frame timing calibration in a door activation system comprising the steps of:
   providing an RF receiver, the receiver having frame timing;
   receiving an incoming RF signal with the receiver;
   determining the frame timing of the incoming signal; and
   adjusting the receiver frame timing based on the frame timing of the incoming signal, wherein the incoming signal comprises a frame start sequence of at least one bit having a first rising edge, and a last falling edge and wherein the step of determining the frame timing of the incoming signal comprises the steps of:
   detecting the first rising edge;
   detecting the last falling edge; and determining the time difference between the first rising edge and the last falling edge.

5. The method of claim 4, further comprising, after the step of determining the time difference, the steps of:

determining if the time difference is valid for use in determining frame timing; and rejecting non-valid time differences, such that receiver frame timing is not adjusted based on invalid time differences.

* * * * *